(12) United States Patent
Ito et al.

(10) Patent No.: US 11,794,719 B2
(45) Date of Patent: Oct. 24, 2023

(54) IN-VEHICLE ACTUATOR CONTROL METHOD AND IN-VEHICLE ACTUATOR CONTROL APPARATUS

(71) Applicant: Nissan Motor Co., Ltd., Yokohama (JP)

(72) Inventors: Azusa Ito, Kanagawa (JP); Hidekatsu Akiyama, Kanagawa (JP); Takanobu Sawada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 37 days.

(21) Appl. No.: 17/629,239

(22) PCT Filed: Jul. 20, 2020

(86) PCT No.: PCT/JP2020/028172
§ 371 (c)(1),
(2) Date: Jan. 21, 2022

(87) PCT Pub. No.: WO2022/018814
PCT Pub. Date: Jan. 27, 2022

(65) Prior Publication Data
US 2022/0266816 A1 Aug. 25, 2022

(51) Int. Cl.
*B60W 20/17* (2016.01)
*B60W 40/06* (2012.01)
(Continued)

(52) U.S. Cl.
CPC ............ *B60W 20/17* (2016.01); *B60W 10/06* (2013.01); *B60W 40/06* (2013.01); *B60K 6/46* (2013.01);
(Continued)

(58) Field of Classification Search
None
See application file for complete search history.

(56) References Cited

U.S. PATENT DOCUMENTS 5,586,028 A 12/1996 Sekine et al.
6,137,250 A * 10/2000 Hirano .................. B60W 20/00
318/140

(Continued)

FOREIGN PATENT DOCUMENTS

| JP | H08-138187 A | 5/1996 |
| JP | 2009-269530 A | 11/2009 |
| JP | 2015-038516 A | 2/2015 |

*Primary Examiner* — Todd Melton
*Assistant Examiner* — Jason R Roberson
(74) *Attorney, Agent, or Firm* — Young Basile Hanlon & MacFarlane, P.C.

(57) ABSTRACT

When an estimation state of a road noise value based on an angular acceleration of a wheel is a proper estimation state, it is determined whether a background noise of the vehicle is in the high background or the low background noise state according to magnitudes of the road noise value and a predetermined threshold value. When the estimation state is not the proper estimation state, it is determined that the background noise of the vehicle is in the low background noise state regardless of road noise value. When the background noise is in the high background noise state, an output of the in-vehicle actuator is set so noise accompanying an operation of the in-vehicle actuator becomes relatively large. When the background noise is in the low background noise state, an output of the in-vehicle actuator is set so that noise accompanying an operation of the in-vehicle actuator becomes relatively small.

8 Claims, 13 Drawing Sheets

(51) Int. Cl.
  *B60W 10/06* (2006.01)
  *B60K 6/46* (2007.10)
(52) U.S. Cl.
  CPC ... *B60W 2510/18* (2013.01); *B60W 2520/105* (2013.01); *B60W 2520/26* (2013.01)

(56) References Cited

U.S. PATENT DOCUMENTS

| | | | | |
|---|---|---|---|---|
| 2014/0210216 | A1* | 7/2014 | Konishi | F02N 11/0803 290/38 R |
| 2018/0056982 | A1* | 3/2018 | Endo | B60W 20/20 |
| 2018/0345979 | A1* | 12/2018 | Abdossalami | B60W 40/064 |

* cited by examiner

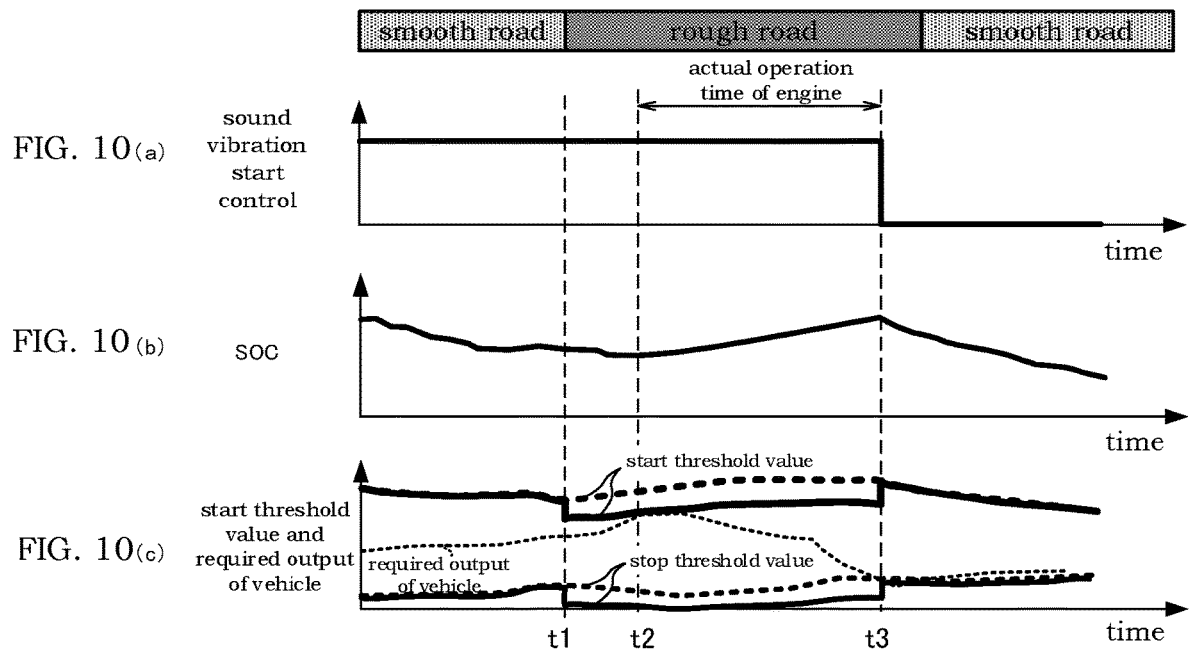

IN-VEHICLE ACTUATOR CONTROL METHOD AND IN-VEHICLE ACTUATOR CONTROL APPARATUS

TECHNICAL FIELD

The present invention relates to an in-vehicle actuator control method and an in-vehicle actuator control apparatus.

BACKGROUND ART

JP2015-38516A discloses a road surface condition estimating method that estimates a road surface condition from a time-series waveform of tire vibration during traveling.

SUMMARY OF INVENTION

The time-series waveform of tire vibration used to estimate an existing road surface condition described in the aforementioned JP2015-38516A includes micro-vibrations due to a disturbance element acting on a wheel (such as mechanical brake operation or wheel slip). This disturbance element makes it difficult to extract a waveform component that truly represents the road surface condition from the time-series waveform, and thus, the estimation accuracy of the road surface condition is lowered.

On the other hand, the present inventors, as a result of diligent study, have led to the development of a control method that estimates a magnitude of a so-called road noise (noise caused by collision or friction between road surface and tires) from the road surface condition, increases an output of an in-vehicle actuator (compressor, fan, engine, etc.) which is the source of noise when the road noise increases, and reduces the discomfort caused by noise to an occupant.

However, as described above, in the existing method of estimating the road surface condition, an error may occur due to the disturbance element acting on the wheel, and an error may also occur in the estimated value of the magnitude of the road noise. If an estimated value with such an error is used, the output of the in-vehicle actuator may be increased even though the magnitude of the road noise is actually small, and thus may cause discomfort due to noise to the occupant.

Therefore, the object of the present invention is to more reliably prevent giving an uncomfortable feeling to the occupant due to a noise accompanying an operation of an in-vehicle actuator.

The control method of the vehicle of the present invention is an in-vehicle actuator control method that controls an operation of an in-vehicle actuator which is a noise source, and includes: a road noise value estimating step that estimates a road noise value which quantifies a magnitude of a road noise from an angular acceleration of a wheel of the vehicle or a parameter related thereto; an estimation state determining step that determines whether or not the estimation state of the road noise value is a proper estimation state; a background noise state determining step that determines whether the background noise of the vehicle is in a high background noise state in which the background noise of the vehicle is relatively large or a low background noise state in which the background noise of the vehicle is relatively small based on the road noise value and the estimation state; and an output adjusting step that adjusts the output of the in-vehicle actuator according to the determined background noise state of the vehicle. Particularly, in the background noise state determining step, when it is determined that the estimation state is the proper estimation state, it is determined whether the background noise of the vehicle is in the high background noise state or the low background noise state according to magnitudes of the road noise value and a predetermined threshold value. Further, when it is determined that the estimation state is not the proper estimation state, it is determined that the background noise of the vehicle is in the low background noise state regardless of the road noise value. Further, in the output adjusting step, when it is determined that the background noise of the vehicle is in the high background noise state, the output of the in-vehicle actuator is set so that the noise accompanying the operation of the in-vehicle actuator becomes relatively large. On the other hand, when it is determined that the background noise of the vehicle is in the low background noise state, the output of the in-vehicle actuator is set so that the noise accompanying the operation of the in-vehicle actuator becomes relatively small.

BRIEF DESCRIPTION OF DRAWINGS

FIGS. 10(a)-(c) are diagrams explaining a control result according to this embodiment.

DESCRIPTION OF EMBODIMENTS

Hereinafter, embodiments of the present invention will be described with reference to the drawings.

First Embodiment

Figure 1:
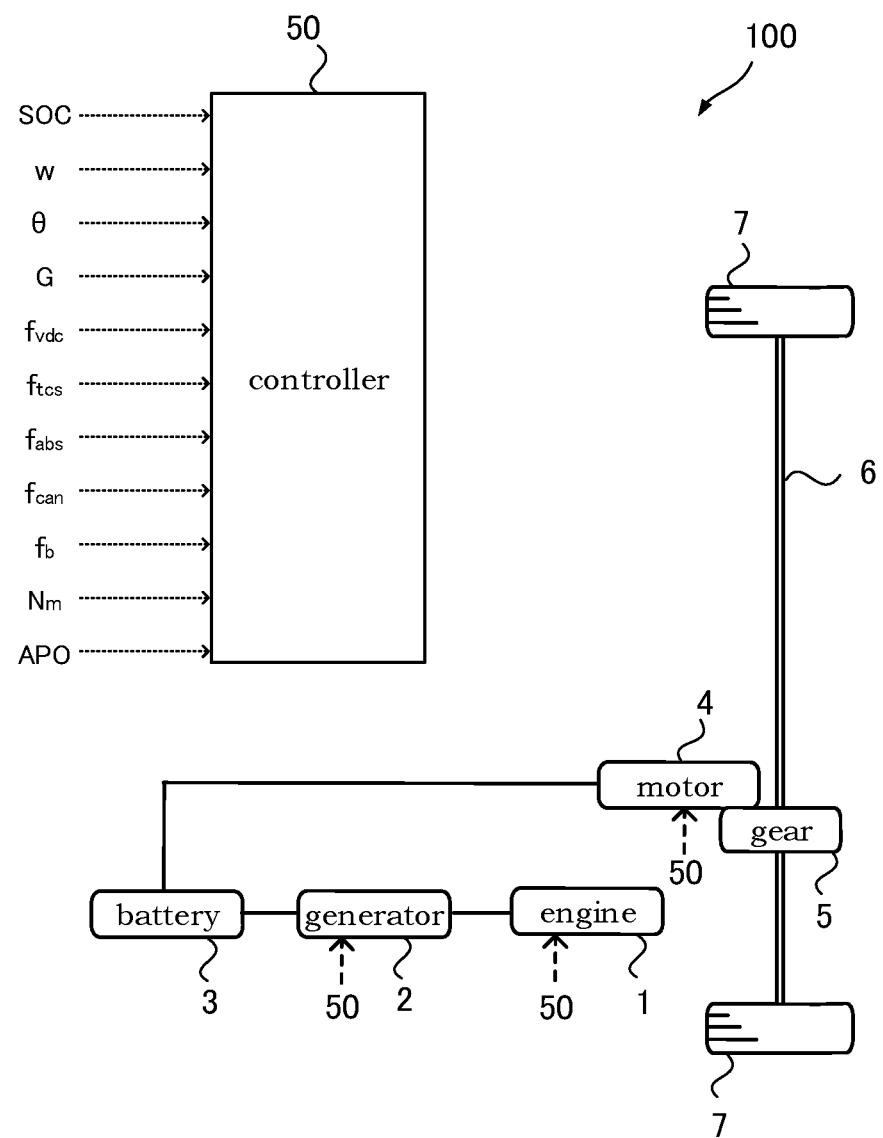
FIG. 1 is a diagram explaining a configuration of a series hybrid vehicle in which an in-vehicle actuator control method according to an embodiment of the present invention is executed.

FIG. 1 is a block diagram explaining a configuration common to series hybrid vehicles (hereinafter, also simply referred to as "vehicle 100") to which the in-vehicle actuator control method (particularly, the engine start/stop permission control method) according to this embodiment is applied.

As shown in FIG. 1, the vehicle 100 is configured as a so-called series hybrid vehicle including an engine (internal combustion engine) 1, a power generator 2, a battery 3, an electric drive motor 4, a gear 5, a shaft 6, wheels 7, and a controller 50. That is, in the vehicle 100, the power generator 2 is driven by the engine 1 to charge the battery 3 and the battery 3 supplies electric power to the drive motor 4 for traveling according to a required output $P_r$. Further, in this embodiment, the in-vehicle actuator to be controlled includes the engine 1, power generator 2, and drive motor 4.

The engine 1 is mechanically connected to the power generator 2 via a speed increaser (not illustrated), and the power generator 2 is connected to the battery 3 so that power can be transmitted or received therebetween.

The drive motor 4 is mechanically connected to the shaft 6 via the gear 5, and the shaft 6 is mechanically connected to the wheels 7. The driving force (or regenerative force) of the drive motor 4 is transmitted to the wheels 7 via the gear 5 and shaft 6. Thus, the rotation speed of the wheels 7 (that is, the acceleration or deceleration of the vehicle 100) is regulated by the driving force (or regenerative force) of the drive motor 4.

Particularly, in the vehicle 100 of this embodiment, in addition to a mechanical brake that brakes the vehicle 100 in response to an operation on a brake pedal mounted on the vehicle 100, there is mounted a regenerative brake that obtains braking force by regenerating the drive motor 4 according to a decrease amount when a depression amount for an accelerator pedal mounted on the vehicle 100 decreases by the mount.

The controller 50 is a computer programmed to manage the overall control of the vehicle 100 including the processes related to the engine control method as the in-vehicle actuator control method according to this embodiment. More specifically, the controller 50 is configured by providing a program, which is for executing the processes constituting the in-vehicle actuator control method, in a hardware configuration consisting of a central processing unit (CPU), read-only memory (ROM), random access memory (RAM), and input/output interface (I/O interface). Further, the controller 50 may be realized by implementing the above program on one piece of computer hardware, or may be realized by distributing and implementing the above program on a plurality of pieces of computer hardware. As a specific example, the function of the controller 50 can be realized by various computers such as a battery controller, a vehicle controller, and a motor controller mounted on the vehicle 100.

The controller 50 executes the above engine control method using inputs of various parameters received from various unillustrated sensors or other unillustrated controllers. Specifically, as inputs, the controller 50 acquires a detected value of the state of charge of the battery 3 (SOC: State Of Charge) (hereinafter also referred to as "battery SOC"), a detected value of the rotation speed of the wheels 7 (hereinafter also referred to as "wheel speed w"), a detected value of a steering angle with respect to a steering mounted on the vehicle 100 (hereinafter also referred to as "steering angle θ"), a detected value of forward/backward G (ratio of the acceleration of the vehicle 100 in forward or backward direction to the gravitational acceleration) (hereinafter also referred to as "detected value of forward/backward G"), a flag indicating an operation of a sideslip prevention system (VDC: Vehicle Dynamics Control) (hereinafter also referred to as "VDC start flag $f_{vdc}$"), a flag indicating an operation of TCS (Traction Control System) (hereinafter also referred to as "TCS operation flag $f_{tcs}$"), a flag indicating whether ABS (Anti-lock Brake System) is operating (hereinafter also referred to as "ABS operation flag $f_{abs}$"), a flag indicating the validity of CAN (Controller Area Network) communication (hereinafter also referred to as "CAN validity flag $f_{can}$"), a flag indicating that the mechanical brake mounted on the vehicle 100 is being operated (operation on the brake pedal) (hereinafter also referred to as "brake pedal operation flag $f_b$"), an estimated value of the rotation speed of the drive motor 4 (hereinafter also referred to as "motor rotation speed $N_m$"), and an amount of operation on the accelerator pedal mounted on the vehicle 100 (hereinafter also referred to as "accelerator opening APO").

Further, in this embodiment, the accelerator opening APO defines the magnitude of the output (mainly the electric power consumed by the traveling of the vehicle 100) required for the vehicle 100 (particularly, the drive motor 4). Particularly, in this embodiment, the controller 50 executes power running control that requires the drive motor 4 to provide a positive driving force when the accelerator opening APO is equal to or greater than a predetermined value, and executes regenerative control that requires the drive motor 4 to provide a negative driving force (that is, regenerative braking force) when the accelerator opening APO is less than the predetermined value. That is, if the accelerator opening APO is equal to or greater than the predetermined value, the output required for the vehicle 100 is a positive value, and if the accelerator opening APO is less than the predetermined value, the output required for the vehicle 100 is a negative value. In the following description, from the viewpoint of simplification of description, the output (positive value or negative value) required for this vehicle 100 is referred to as "required output $P_r$".

Figure 2:
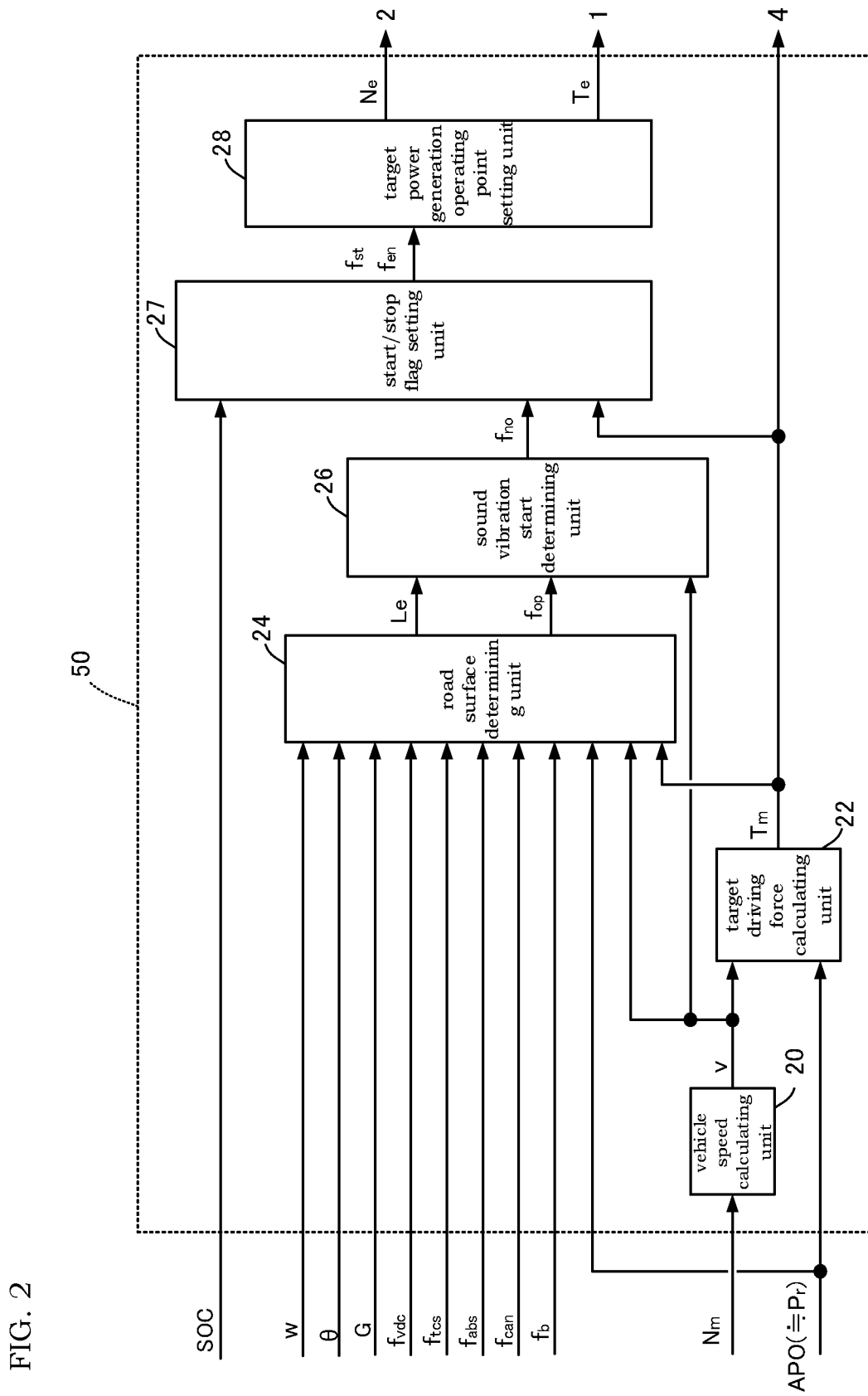
FIG. 2 is a block diagram illustrating a function of a controller that executes a process related to the in-vehicle actuator control method.

FIG. 2 is a block diagram illustrating the function of the controller 50. As illustrated, the controller 50 includes a vehicle speed calculating unit 20, a target driving force calculating unit 22, a road surface determining unit 24, a sound vibration start determining unit 26, a start/stop flag setting unit 27, and a target power generation operating point setting unit 28.

The vehicle speed calculating unit 20 calculates the vehicle speed v of the vehicle 100 based on the motor rotation speed $N_m$. The vehicle speed calculating unit 20 outputs the calculated vehicle speed v to the target driving force calculating unit 22 and the road surface determining unit 24.

The target driving force calculating unit 22 calculates the target value of the driving force set in the drive motor 4 (hereinafter also referred to as "target motor torque $T_m$") based on the vehicle speed v and accelerator opening APO (required output $P_r$) from the vehicle speed calculating unit 20. The target driving force calculating unit 22 outputs the calculated target motor torque $T_m$ to the road surface determining unit 24 and the drive motor 4 (a motor inverter which is not illustrated in more detail).

The road surface determining unit 24 sets the road surface level Le based on the wheel speed w, steering angle θ, detected value of forward/backward G, VDC start flag $f_{vdc}$, TCS operation flag $f_{tcs}$, ABS operation flag $f_{abs}$, CAN validity flag $f_{can}$, brake pedal operation flag $f_b$, and accelerator opening APO.

Here, the road surface level Le is a parameter that indexes the state of the background noise of the vehicle 100 when the vehicle 100 is traveling. Particularly, the road surface level Le is set as a parameter that indexes an estimated value (hereinafter also referred to as "road noise value") that quantifies the degree of road surface roughness calculated based on the wheel speed w (more specifically, an angular acceleration A to be described later) and whether or not the estimation state of the road noise value is the proper estimation state. More specifically, the road surface level Le of this embodiment includes "0" corresponding to the case where the estimation state of the road noise value is not the proper estimation state and "1"-"4" which level the magnitude of the road noise value at each predetermined stage. Particularly, in this embodiment, the magnitude of the road surface level Le is used as an index for estimating whether the background noise of the vehicle 100 is relatively large or small. More specifically, when the road surface level Le is "0"-"2", the background noise state is estimated to be the low background noise state, and when the road surface level Le is "3"-"4", the background noise state is estimated to be the high background noise state.

Hereinafter, the details of the process related to the setting of the road surface level Le by the road surface determining unit 24 will be described.

Figure 3:
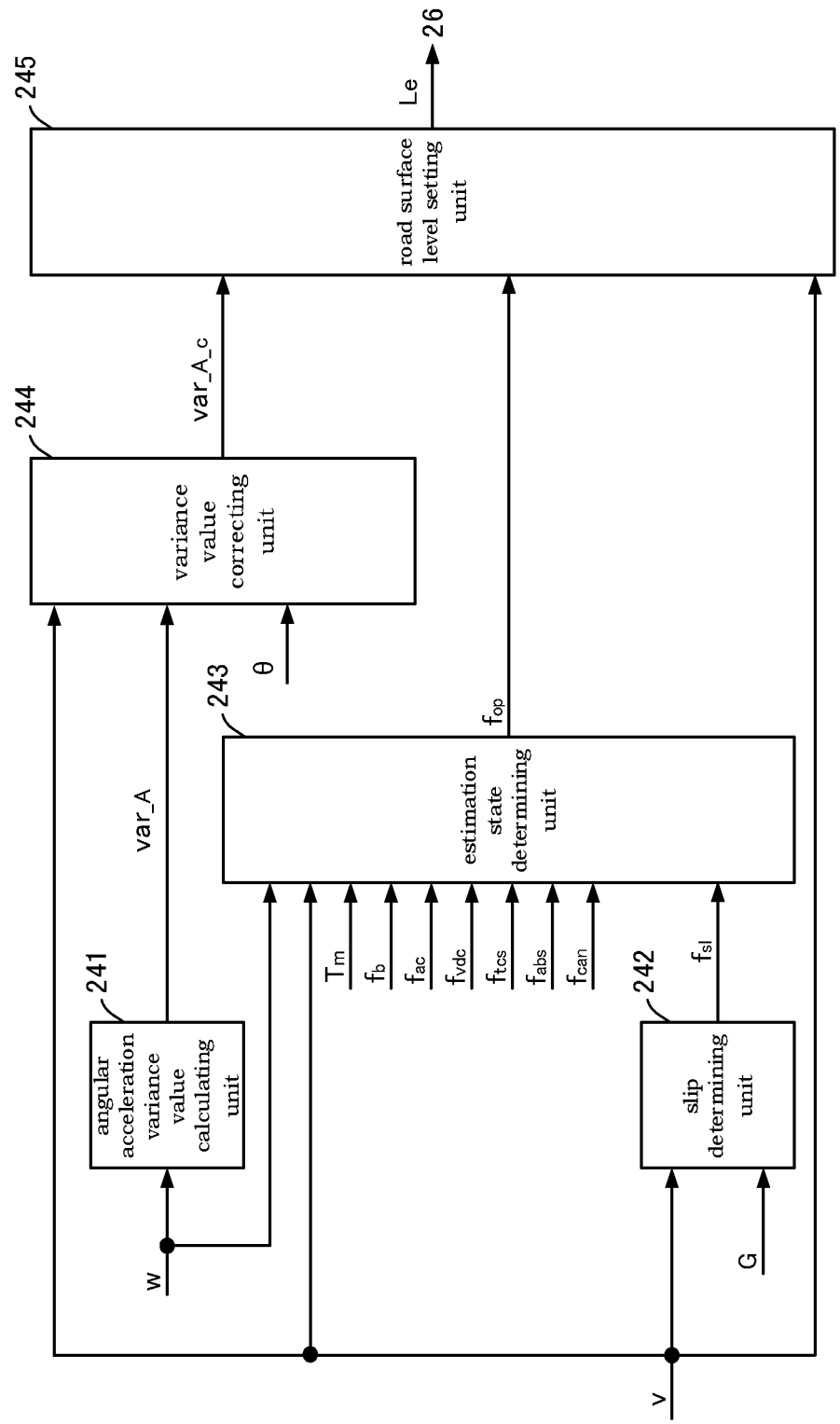
FIG. 3 is a block diagram illustrating a function of a road surface determining unit.

FIG. 3 is a block diagram illustrating the function of the road surface determining unit 24. As illustrated, the road surface determining unit 24 includes an angular acceleration variance value calculating unit 241, a slip determining unit 242, an estimation state determining unit 243, a variance value correcting unit 244, and a road surface level setting unit 245.

The angular acceleration variance value calculating unit 241 calculates the variance value of the angular acceleration A of wheels 7 (hereinafter also referred to as "angular acceleration variance value var_A") based on the wheel speed w. Specifically, the angular acceleration variance value calculating unit 241 obtains the angular acceleration A by calculating a first derivative of the wheel speed w with respect to time. Then, the angular acceleration variance value calculating unit 241 samples the angular acceleration A and sets the variance thereof as the angular acceleration variance value var_A. Hereinafter, this variance value is also referred to as "angular acceleration variance value var_A".

Here, the angular acceleration variance value var_A represents the variation of the angular acceleration A, and is a parameter that correlates to the roughness of the traveling road surface of the vehicle 100 (road noise value). Therefore, the angular acceleration variance value var_A can be used as an index for estimating the magnitude of the road noise value that determines the road surface level Le. Further, instead of the angular acceleration variance value var_A, an arbitrary statistic that correlates to the variation of the angular acceleration A such as standard deviation and root mean square may be calculated as an estimation index of the road noise value. Then, the angular acceleration variance value calculating unit 241 outputs the calculated angular acceleration variance value var_A to the variance value correcting unit 244.

The slip determining unit 242 executes the slip determining process using inputs of the vehicle speed v and the detected value of forward/backward G from the vehicle speed calculating unit 20. The slip determining process is a process of setting the slip flag $f_{sl}$, which indicates that the vehicle 100 has slipped (or the slip is predicted), in a specific traveling scene of the vehicle 100 (low-speed traveling state immediately after starting from the stopped state of the vehicle). Particularly, in this embodiment, the slip determining process is executed as one of the elements for determining whether or not the estimation state of the road noise value is the proper estimation state. Particularly, the slip determining process is executed from the viewpoint of detecting the occurrence of slip, with respect to which the estimation accuracy of the road noise value based on the angular acceleration variance value var_A decreases, although the vehicle 100 has not reached the extent of slipping due to an operation of the above-mentioned TCS or VDC.

Figure 4A:
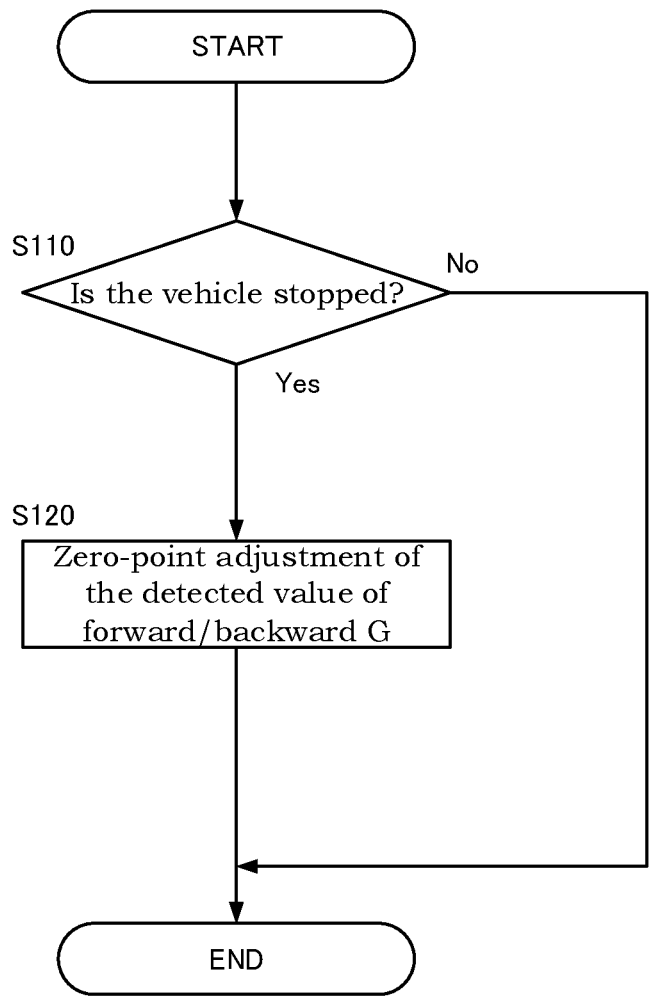
FIG. 4A is a flowchart explaining a zero-point adjustment of a detected value of forward/backward G in a slip determining process.
Figure 4B:
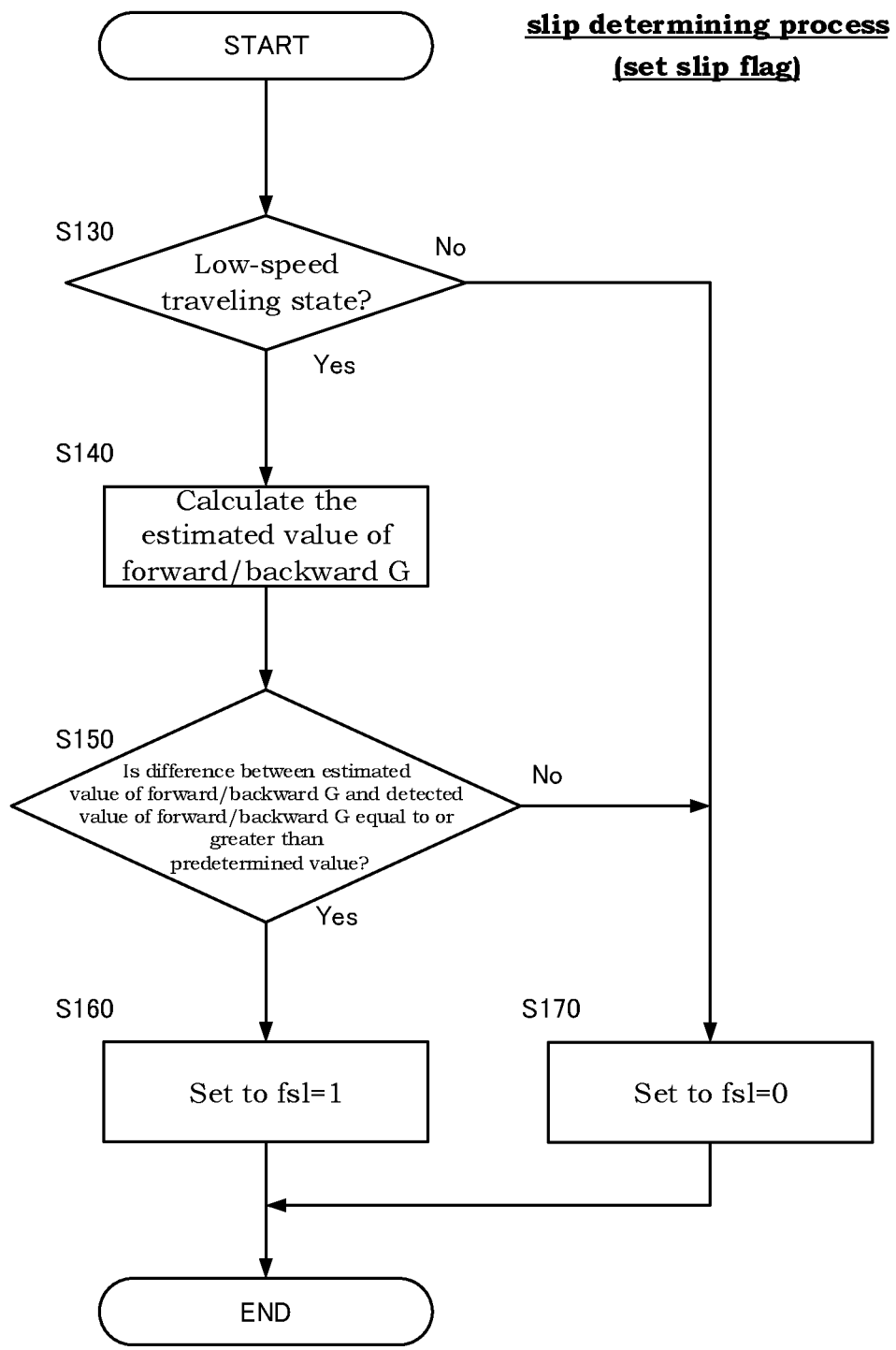
FIG. 4B is a flowchart explaining a setting of a slip flag in the slip determining process.

FIG. 4A and FIG. 4B are flowcharts for explaining the slip determining process. Particularly, FIG. 4A shows the processing flow related to the input adjustment of forward/backward G, and FIG. 4B shows the processing flow related to the setting of the slip flag $f_{sl}$. Further, the processes related to FIG. 4A and FIG. 4B can be executed in parallel with each other.

First, in Step S110 as shown in FIG. 4A, the slip determining unit 242 determines whether or not the vehicle 100 has stopped. Specifically, the slip determining unit 242 counts the time during which the vehicle speed v is 0 or substantially 0, and determines that the vehicle 100 has stopped when the time reaches a predetermined vehicle stop determining reference time. The slip determining unit 242 terminates this routine when the slip determining unit 242 determines that the vehicle 100 has not stopped. On the other hand, the slip determining unit 242 executes the processes from Step S120 when the slip determining unit 242 determines that the vehicle 100 has stopped.

In Step S120, the slip determining unit 242 executes a zero-point adjustment on the detected value of forward/backward G. That is, the slip determining unit 242 calculates the difference obtained by subtracting 0 from the detected value of forward/backward G which has been acquired during the stop of the vehicle 100, and stores the difference in a storage region. Then, the slip determining unit 242 acquires the value obtained by subtracting the above difference from the detected value input from the G sensor (for example, strain gauge type or capacitance type), which is not illustrated at the subsequent control timing, as the detected value of forward/backward G.

In Step S130 as shown in FIG. 4B, the slip determining unit 242 determines whether or not the vehicle 100 is in the low-speed traveling state. Specifically, the slip determining unit 242 determines whether or not the vehicle speed v is equal to or less than a predetermined low speed determining threshold value.

Then, when the slip determining unit 242 determines that the vehicle 100 is not in the low-speed traveling state, the slip determining unit 242 sets the slip flag $f_{sl}$ to "0" and terminates this routine. On the other hand, when the slip determining unit 242 determines that the vehicle 100 is in the low-speed traveling state, it executes the processes from Step S140.

In Step S140, the slip determining unit 242 calculates the estimated value of forward/backward G based on the vehicle speed v. Specifically, the slip determining unit 242 calculates the acceleration a by time-differentiating the vehicle speed v, and calculates the estimated value of forward/backward G based on the acceleration a.

Then, in Step S150, the slip determining unit 242 determines whether or not the difference between the detected value of forward/backward G calibrated by the value of the stopped state of the vehicle and the estimated value of forward/backward G calculated based on the vehicle speed v is larger than a predetermined reference value. Here, the predetermined reference value is set to a suitable value from the viewpoint of whether the estimated value of forward/backward G estimated from the vehicle speed v (corresponding to the actual rotation speed of the wheels 7) deviates from the detected value of forward/backward G, which is based on the inertial force actually acting on the vehicle 100, to the extent that an occurrence of a slip of the vehicle 100 can be determined.

Figure 4C:
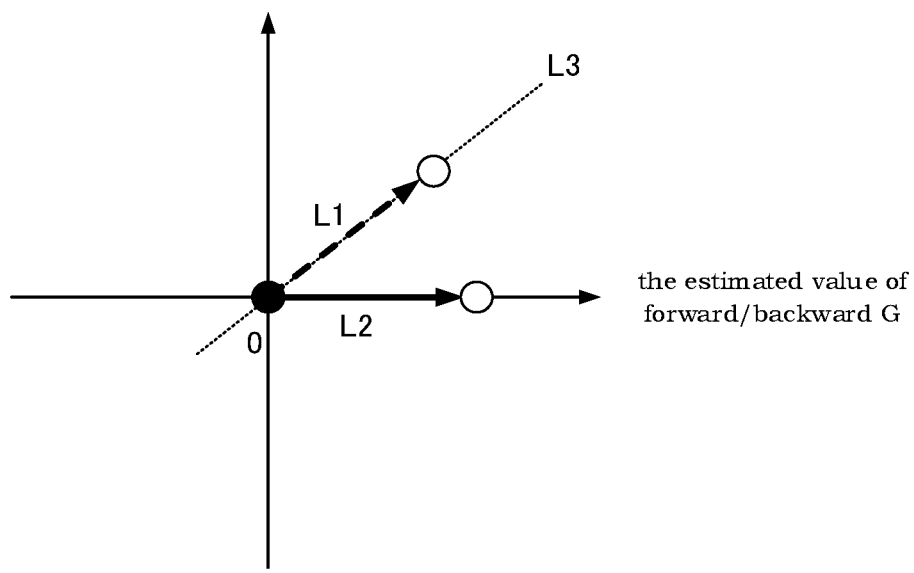
FIG. 4C is a diagram explaining an interrelation among the detected value of forward/backward G, an estimated value of forward/backward G, and a vehicle slip.

FIG. 4C is a diagram explaining the interrelation among the detected value of forward/backward G, the estimated value of forward/backward G, and the slip of the vehicle 100. Further, in the graph of FIG. 4C, the horizontal axis indicates the estimated value of forward/backward G (corresponding to the time derivative value of the motor rotation speed $N_m$), and the vertical axis indicates the detected value of forward/backward G. In addition, the broken line L1 and the solid line L2 represent the relation between the estimated value of forward/backward G and the detected value of forward/backward G when no slip occurs and when a slip occurs, respectively. Further, the dotted line L3 represents a straight line in which the estimated value of forward/backward G and the detected value of forward/backward G are mutually the same.

As can be seen from FIG. 4C, the estimated value of forward/backward G and the detected value of forward/backward G are equal to each other when no slip occurs (broken line L1). On the other hand, when a slip occurs, the rate of change in the rotation speed of the wheels 7 (the rate of change in the motor rotation speed $N_m$) deviates from the value assuming that the grip state of the tire and the road surface is maintained. Therefore, when a slip occurs, the estimated value of forward/backward G (solid line L2) determined based on the vehicle speed v calculated from the motor rotation speed $N_m$ deviates from the detected value of forward/backward G detected by a G sensor (a value detected regardless of the motor rotation speed $N_m$). Therefore, a slip of the vehicle 100 can be suitably detected by referring to the mutual deviation between the estimated value of forward/backward G and the detected value of forward/backward G as described in FIG. 4B.

Then, the slip determining unit 242 sets the slip flag $f_{sl}$ of the vehicle 100 to "1" when the determination result of Step S150 is positive. On the other hand, the slip determining unit 242 sets the slip flag $f_{sl}$ of the vehicle 100 to "0" when the determination result of Step S150 is negative.

Returning to FIG. 3, the slip determining unit 242 outputs the set slip flag $f_{sl}$ to the estimation state determining unit 243.

The estimation state determining unit 243 executes the estimation state determining process to determine whether or not the estimation state of the road noise value is the proper estimation state using the inputs of the wheel speed w, vehicle speed v, target motor torque $T_m$, brake pedal operation flag $f_b$, accelerator opening APO, VDC start flag $f_{vdc}$, TCS operation flag $f_{tcs}$, ABS operation flag $f_{abs}$, CAN validity flag $f_{can}$, and slip flag $f_{sl}$. Particularly, in the estimation state determining process of this embodiment, the proper estimation flag $f_{op}$ is set to "1" when the estimation state of the road noise value is the proper estimation state, and the proper estimation flag $f_{op}$ is set to "0" when the estimation state of the road noise value is not the proper estimation state. The details of the estimation state determining process will be described below.

Figure 5:
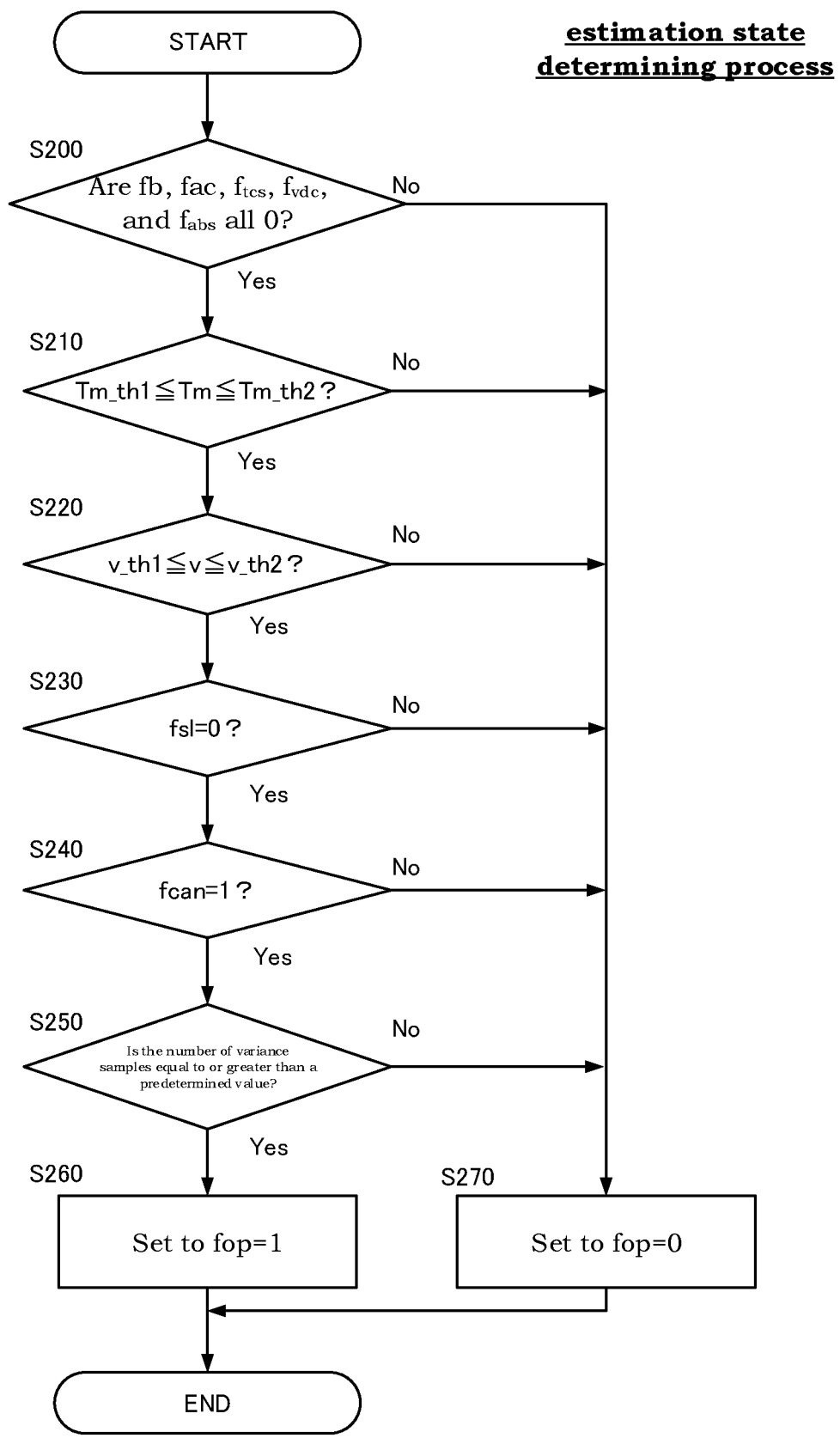
FIG. 5 is a flowchart explaining an estimation state determining process.

FIG. 5 is a flowchart explaining the estimation state determining process.

As illustrated, first, in Step S200, the estimation state determining unit 243 determines whether all of the brake pedal operation flag $f_b$, accelerator off flag $f_{ac}$, VDC start flag $f_{vdc}$, TCS operation flag $f_{tcs}$, and ABS operation flag $f_{abs}$ are set to "0". Further, the accelerator off flag $f_{ac}$ is a flag set to "1" when it is determined that no operation on the accelerator pedal (driving force request for the vehicle 100) has been performed. Specifically, the estimation state determining unit 243 sets the accelerator off flag $f_{ac}$ to "1" when the accelerator opening APO is equal to or less than a predetermined value, and "0" when the accelerator opening APO exceeds the predetermined value.

Then, when the estimation state determining unit 243 determines that at least one of these flag values is "1", it proceeds to Step S270, sets the proper estimation flag $f_{op}$ to "0", and terminates this routine. That is, when it falls under any of the case where an operation on the brake pedal is detected, the case where no operation on the accelerator pedal is detected, the case where VDC is operating, the case where TCS is operating, and the case where ABS is operating, since it is assumed that the calculated value of the angular acceleration A includes an error, it is determined that the estimation state of the road noise value is not proper.

On the other hand, when the estimation state determining unit 243 determines that all the flag values are "0" in the determination of Step S200, the process of Step S210 is executed.

In Step S210, the estimation state determining unit 243 determines whether or not the target motor torque $T_m$ is equal to or greater than the first torque threshold value $T_{m\_th1}$ and equal to or less than the second torque threshold value $T_{m\_th2}$. Then, if the result of the determination is negative, the estimation state determining unit 243 proceeds to Step S270, sets the proper estimation flag $f_{op}$ to "0", and terminates this routine. On the other hand, the estimation state determining unit 243 executes the process of Step S220 if the result of the determination is positive.

Here, the first torque threshold value $T_{m\_th1}$ and the second torque threshold value $T_{m\_th2}$ are the lower limit value and the upper limit value of the target motor torque $T_m$ determined from the viewpoint of ensuring the estimation accuracy of the road noise value, respectively. Further, the first torque threshold value $T_{m\_th1}$ and the second torque threshold value $T_{m\_th2}$ may be set to fixed values that are experimentally determined in advance, or may be set to variable values that change according to the traveling state, etc. of the vehicle 100.

Particularly, the first torque threshold value $T_{m\_th1}$ and the second torque threshold value $T_{m\_th2}$ may be set to variable values according to the vehicle speed v. Further, for example, when the determination result of Step S210 is negative at a certain control timing, a different first torque threshold value $T_{m\_th1}$ or second torque threshold value $T_{m\_th2}$ may be used in such a determination at a later control timing. That is, a predetermined hysteresis may be set for the first torque threshold value $T_{m\_th1}$ and the second torque threshold value $T_{m\_th2}$.

Next, in Step S220, the estimation state determining unit 243 determines whether or not the vehicle speed v is equal to or greater than the first vehicle speed threshold value $v_{\_th1}$ and equal to or less than the second vehicle speed threshold value $v_{\_th2}$. Then, if the result of the determination is negative, the estimation state determining unit 243 proceeds to Step S270, sets the proper estimation flag $f_{op}$ to "0", and terminates this routine. On the other hand, the estimation state determining unit 243 executes the process of Step S230 if the result of the determination is positive.

Here, the first vehicle speed threshold value $v_{\_th1}$ and the second vehicle speed threshold value $v_{\_th2}$ are the lower limit value and the upper limit value of the vehicle speed v determined from the viewpoint of ensuring the estimation accuracy of the road noise value, respectively. Further, the first vehicle speed threshold value $v_{\_th1}$ and the second vehicle speed threshold value $v_{\_th2}$ may be set to fixed values that are experimentally determined in advance, or may be set to variable values that change according to the traveling state, etc. of the vehicle 100. Particularly, for the first vehicle speed threshold value $v_{\_th1}$ and the second vehicle speed threshold value $v_{\_th2}$, a predetermined hysteresis may be set in the same manner as the aforementioned first torque threshold value $T_{m\_th1}$ and second torque threshold value $T_{m\_th2}$.

Next, in Step S230, the estimation state determining unit 243 determines whether or not the slip flag $f_{sl}$ set in the aforementioned slip determining process is "0". When the determination result is negative, the estimation state determining unit 243 proceeds to Step S270, sets the proper estimation flag $f_{op}$ to "0", and terminates this routine. That is, in this case, it is determined that an error may be included in the calculated value of the angular acceleration A for estimating the road noise value due to the slip of the vehicle 100. On the other hand, when the estimation state determining unit 243 determines that the slip flag $f_{sl}$ is "0", the process of Step S240 is executed.

In Step S240, the estimation state determining unit 243 determines whether or not the CAN validity flag $f_{can}$ is "1". When the estimation state determining unit 243 determines that the CAN validity flag $f_{can}$ is not "1", it proceeds to Step S270, sets the proper estimation flag $f_{op}$ to "0", and terminates this routine. That is, in this case, it is assumed that the input parameters such as the wheel speed W for calculating the angular acceleration A cannot be acquired normally, and it is determined that the estimation accuracy of the road noise value may decrease. On the other hand, when the estimation state determining unit 243 determines that the CAN validity flag $f_{can}$ is "1", the process of Step S250 is executed.

In Step S250, the estimation state determining unit 243 determines whether or not the number of variance samples is equal to or greater than a certain value. Specifically, the estimation state determining unit 243 determines whether or not a sufficient number of calculated values of the angular acceleration A are obtained from the viewpoint of suitably calculating the aforementioned angular acceleration variance value var_A based on the timing when it is detected that all the determination results of the aforementioned Step S200-Step S250 are positive.

Then, when the estimation state determining unit 243 determines that the number of variance samples is not equal to or higher than a certain value, it proceeds to Step S270, sets the proper estimation flag $f_{op}$ to "0", and terminates this routine. That is, in this case, it is determined that the number of input data (more specifically, the number of wheel speeds w detected) for determining the appropriate angular acceleration variance value var_A is insufficient from the viewpoint of ensuring the estimation accuracy of the road noise value, and the proper estimation flag $f_{op}$ is set to "0". On the other hand, when the estimation state determining unit 243 determines that the number of variance samples is equal to or higher than a certain value, the process of Step S260 is executed. Further, in the determination of Step S250, when the determination result is negative at a certain control timing, a delay process that stands by until the number of variance samples is ensured (that is, until the determination result becomes positive) may be adopted.

Then, when all the determination results of the aforementioned Step S200-Step S250 are positive, in Step S260, the estimation state determining unit 243 sets the proper estimation flag $f_{op}$ to "1" and terminates this routine. That is, in this embodiment, when all the determination results of the aforementioned Step S200-Step S250 are positive, it is determined that the estimation accuracy of the road noise value is ensured at or above a certain level, and the proper estimation flag $f_{op}$ is set to "1".

Returning to FIG. 3, the estimation state determining unit 243 outputs the set proper estimation flag $f_{op}$ to the road surface level setting unit 245.

On the other hand, the variance value correcting unit 244 corrects the angular acceleration variance value var_A using inputs of the vehicle speed v, the steering angle θ, and the angular acceleration variance value var_A. Specifically, the variance value correcting unit 244 corrects the angular acceleration variance value var_A using a table in which the correction coefficients corresponding to the vehicle speed v and the steering angle θ are determined. Particularly, in this embodiment, correction is performed in a manner that the angular acceleration variance value var_A decreases as the vehicle speed v or the steering angle θ increases. In addition, instead of or in addition to the correction of the angular acceleration variance value var_A based on this vehicle speed v and steering angle θ, a configuration, in which the threshold value to be compared with the angular acceleration variance value var_A is corrected according to the vehicle speed v and the steering angle θ, may be adopted in the process of setting the road surface level Le in the road surface level setting unit 245 to be described later.

The significance of this correction will be explained. When a steering operation is performed, the wheels 7 slip slightly as compared to when no steering operation is performed, and therefore, when the wheels 7 get over a convex part on an uneven road surface, the dispersion of the angular acceleration A of the wheels 7 tends to be larger than expected. Therefore, when a steering operation is performed, correction is performed to reduce the angular acceleration variance value var_A according to the magnitude of the vehicle speed v from the viewpoint of maintaining the estimation accuracy of the road noise value. Then, the variance value correcting unit 244 outputs the corrected angular acceleration variance value var_A_c to the road surface level setting unit 245.

The road surface level setting unit 245 sets the abovementioned road surface level Le using inputs of the angular acceleration variance value var_A_c and the proper estimation flag $f_{op}$. Particularly, the road surface level setting unit 245 sets the road surface level Le to "0" regardless of the angular acceleration variance value var_A_c when the proper estimation flag $f_{op}$ is set to "0" (that is, when the estimation state of the road noise value is not the proper estimation state).

On the other hand, the road surface level setting unit 245 sets the road surface level Le to "1"-"4" according to the magnitude of the road noise value (that is, the angular acceleration variance value var_A_c) when the proper estimation flag $f_{op}$ is set to "1" (when the estimation state of the road noise value is the proper estimation state). More specifically, the road surface level setting unit 245 sets three threshold values for the angular acceleration variance value var_A_c, and allocates "1", "2", "3", and "4" as the road surface level Le to each range of the four angular acceleration variance values var_A_c defined by the 3 threshold values, respectively. Then, the road surface level setting unit 245 outputs the set road surface level Le to the sound vibration start determining unit 26.

Further, in this embodiment, the case where the road surface level Le is set to "0", "1", or "2" corresponds to the low background noise state, and the case where the road surface level Le is set to "3" or "4" corresponds to the high background noise state.

Returning to FIG. 2, the sound vibration start determining unit 26 executes the sound vibration start determining process for determining whether or not to enable the control (hereinafter also referred to as "sound vibration start control") for adjusting the value of the required output $P_r$ at which the engine 1 should be started (hereinafter also referred to as "start threshold value $P_{r\_sth}$") or the value of the required output $P_r$ at which the engine 1 should be stopped (hereinafter also referred to as "stop threshold value $P_{r\_eth}$") according to the magnitude of the road surface level Le using inputs of the road surface level Le, the proper estimation flag $f_{op}$, and the vehicle speed v. Particularly, in the estimation state determining process of this embodiment, the deactivation flag $f_{no}$ is set to "0" when the sound vibration start determining process should be executed, and is set to "1" when the sound vibration start determining process should not be executed. The details of the sound vibration start determining process will be described below. Further, in this embodiment, it is assumed that the initial value of the deactivation flag $f_{no}$ is set to either "0" or "1" when the vehicle 100 is started (when the ignition switch is turned on).

Figure 6A:
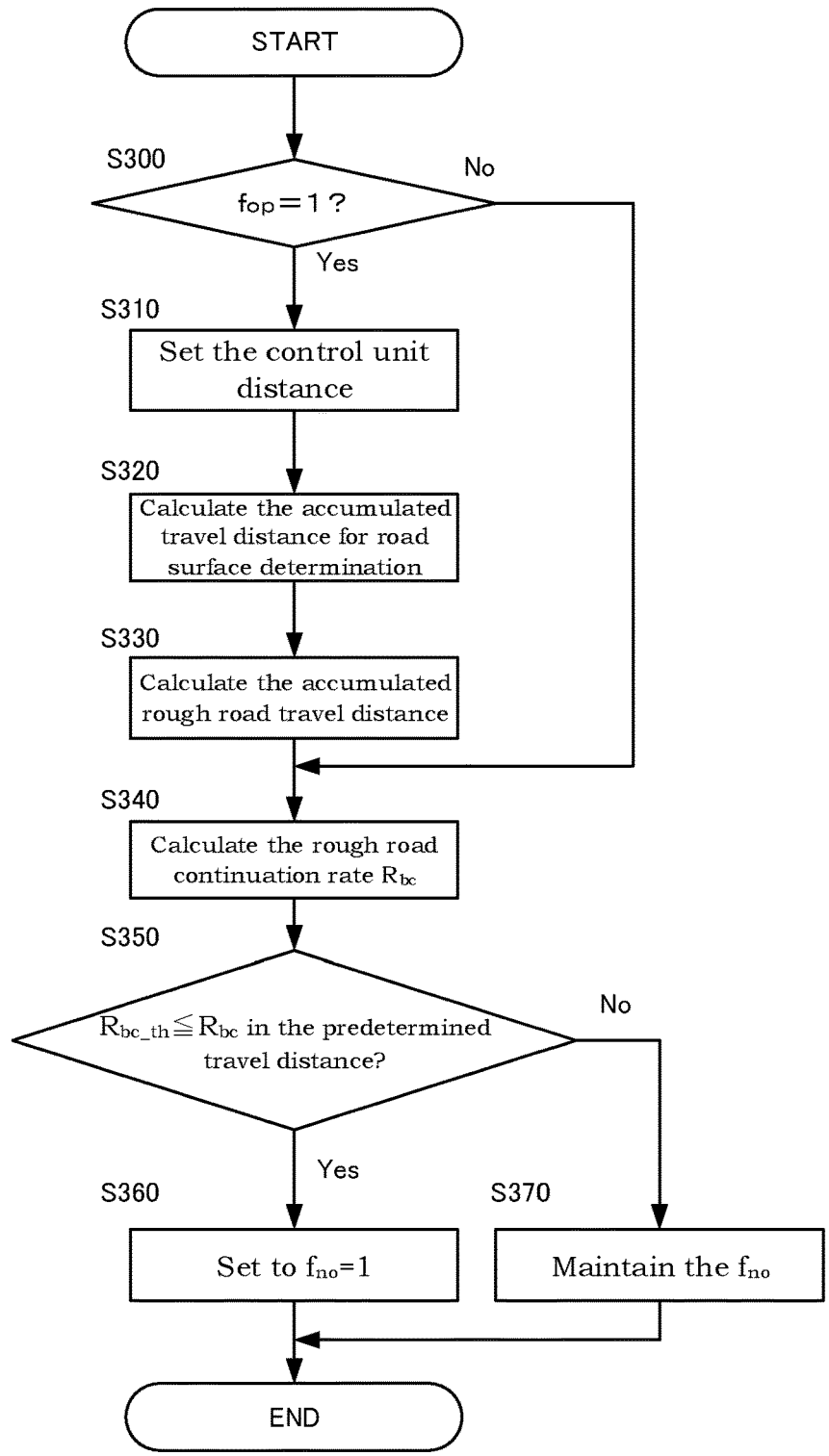
FIG. 6A is a flowchart explaining a process of setting a deactivation flag.
Figure 6B:
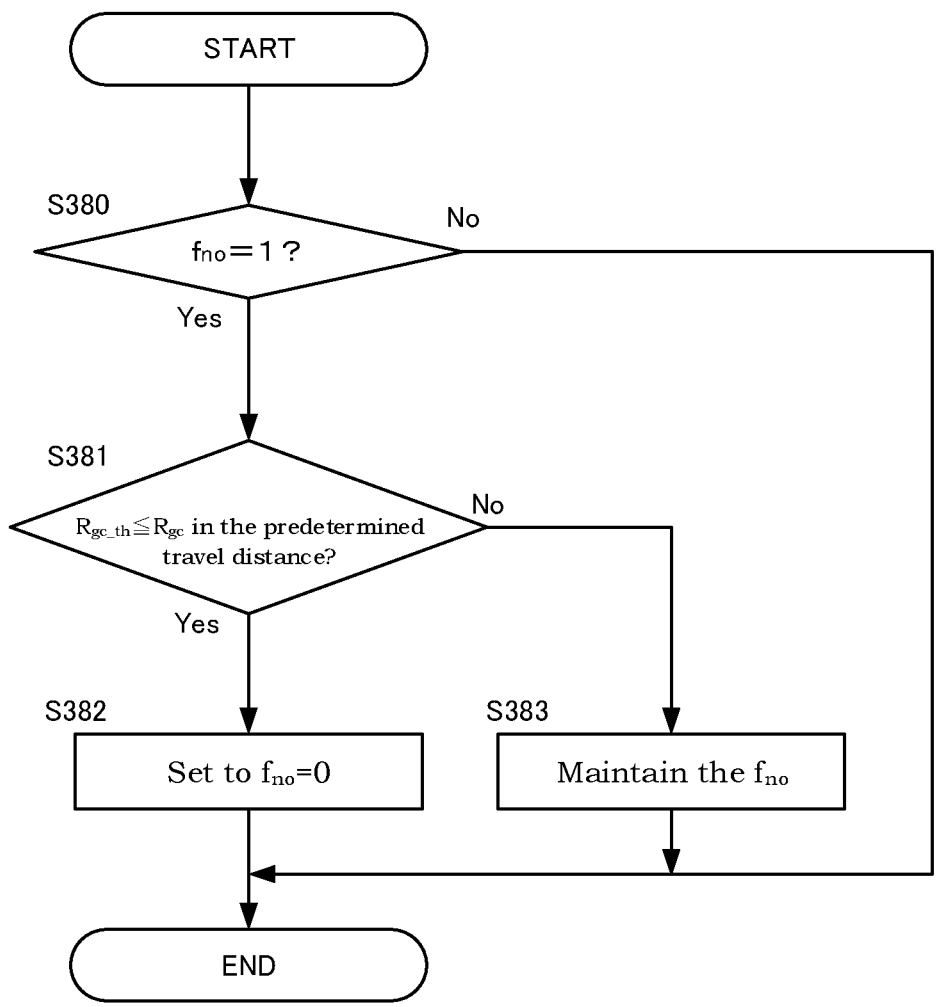
FIG. 6B is a flowchart explaining a process of clearing the deactivation flag.

FIG. 6A and FIG. 6B are flowcharts explaining the sound vibration start determining process. Particularly, FIG. 6A is a flowchart explaining the determination of setting the deactivation flag $f_{no}$ to "1" to deactivate the sound vibration start control (deactivation flag setting determination). Further, FIG. 6B is a flowchart explaining the determination of clearing the deactivation flag $f_{no}$ set based on the process of FIG. 6A (deactivation flag clear determination).

First, in the deactivation flag setting determination shown in FIG. 6A, in Step S300, the sound vibration start determining unit 26 determines whether or not the proper estimation flag $f_{op}$ is set to "1". Then, when the sound vibration start determining unit 26 determines that the proper estimation flag $f_{op}$ is "1", the processes from Step S310 are executed.

In Step S310, the sound vibration start determining unit 26 sets the control unit distance $d_u$. Here, the control unit distance $d_u$ is the distance traveled by the vehicle 100 during a preset calculation period $\Delta t$ (for example, 10 ms). That is, the control unit distance $d_u$ is defined as a value obtained by multiplying the vehicle speed v by the calculation period $\Delta t$, and is a variable amount according to the magnitude of the vehicle speed v.

In Step S320, the sound vibration start determining unit 26 calculates the road surface determination accumulated travel distance D. Specifically, first, the sound vibration start determining unit 26 acquires the total travel distance of the vehicle 100 from the start of the vehicle 100 (for example, the timing when the ignition switch is turned on) to the current control period. Then, the sound vibration start determining unit 26 calculates the travel distance at the time of proper estimation, that is, the distance traveled by the vehicle 100 with the proper estimation flag $f_{op}$ set to "1" from the start of the vehicle 100 to the current control period. More specifically, the sound vibration start determining unit 26 obtains the road surface determination accumulated travel distance D by multiplying the number of controls whose proper estimation flag $f_{op}$ is set to "1" by the above control unit distance $d_u$.

In Step S330, the sound vibration start determining unit 26 calculates the accumulated rough road travel distance $D_{ba}$. Specifically, the sound vibration start determining unit 26 obtains the accumulated rough road travel distance $D_{ba}$ by multiplying the number of controls whose proper estimation flag $f_{op}$ is set to "1" and road surface level Le set to "3" or "4" by the above control unit distance $d_u$ from the start of the vehicle 100 to the current control period.

Then, in Step S340, the sound vibration start determining unit 26 calculates the rough road continuation rate $R_{bc}$. Specifically, the sound vibration start determining unit 26 divides the accumulated rough road travel distance $D_{ba}$ by the road surface determination accumulated travel distance D to obtain the rough road continuation rate $R_{bc}$.

Next, in Step S350, the sound vibration start determining unit 26 determines whether or not the rough road continuation rate $R_{bc}$ is equal to or greater than a predetermined rough road continuation rate threshold value $R_{bc\_th}$ in the state that the vehicle 100 has traveled over a predetermined travel distance $D_{\_th}$. Specifically, the sound vibration start determining unit 26 calculates the predetermined travel distance $D_{\_th}$ by multiplying the predetermined number of controls by the above control unit distance $d_u$. Then, the sound vibration start determining unit 26 determines whether or not the rough road continuation rate $R_{bc}$ is equal to or greater than the rough road continuation rate threshold value $R_{bc\_th}$ in the control period during the traveling over the predetermined travel distance $D_{\_th}$. In addition, the rough road continuation rate threshold value $R_{bc\_th}$ is set to a suitable value from the viewpoint of determining whether or not an erroneous determination continues in the determination on whether the traveling road of the vehicle 100 is "rough road" or "smooth road" (determination based on the road surface level Le).

Particularly, the rough road continuation rate threshold value $R_{bc\_th}$ is set from the viewpoint of determining whether or not the operating time of the engine 1 becomes longer and the fuel consumption is reduced when the operation of the sound vibration start control is enabled. More specifically, it is assumed that by continuing a state in which the erroneous determination that the vehicle 100 is traveling on a "rough road" is maintained for a certain period of time or more to enable the operation of the sound vibration start control (a state where the engine 1 is easy to start or difficult to stop), the battery SOC will rise and the engine 1 will start and stop frequently. Therefore, the rough road continuation rate threshold value $R_{bc\_th}$ is set to a suitable value from the viewpoint of suppressing such a situation.

Then, when the sound vibration start determining unit 26 determines that the rough road continuation rate $R_{bc}$ is equal to or greater than the rough road continuation rate threshold value $R_{bc\_th}$ over the predetermined travel distance $D_{\_th}$, it proceeds to Step S360, sets the deactivation flag $f_{no}$ to "1", and terminates this routine. That is, in this case, the sound vibration start control is invalidated. On the other hand, when the above determination result is negative, the sound vibration start determining unit 26 proceeds to Step S370 and terminates this routine while maintaining the deactivation flag $f_{no}$.

On the other hand, in Step S300, when the sound vibration start determining unit 26 determines that the proper estimation flag $f_{op}$ is not "1" (determines that it is "0"), it shifts to the process of Step S340. That is, when it is determined that the estimation state of the road noise value is not proper in this control period, the sound vibration start determining unit 26 calculates the rough road continuation rate $R_{bc}$ without executing the calculation of the road surface determination accumulated travel distance D in Step S320 and the calculation of the accumulated rough road travel distance $D_{ba}$ in Step S330.

Thereby, if the vehicle 100 continues to travel in a state where the estimation state of the road noise value is not proper, the distance related to the traveling can be excluded from the calculation target of the road surface determination accumulated travel distance D, and it is possible to suppress a decrease in the accuracy of the calculated rough road continuation rate $R_{bc}$. More specifically, by adding the distance in the state where the estimation state of the road noise value is not proper to the road surface determination accumulated travel distance D so that the rough road continuation rate $R_{bc}$ is calculated to be lower than the assumed value, the phenomenon of switching between the operation and non-operation of the sound vibration start control based on an erroneous determination is suppressed.

In addition, it is preferable that the sound vibration start determining unit 26 is configured to reset the road surface determination accumulated travel distance D calculated in Step S320 above to 0 in the control period from switching the deactivation flag $f_{no}$ from "1" to "0". Thereby, in the scene where the vehicle 100 travels a relatively long distance from the start, it is suppressed that the road surface determination accumulated travel distance D becomes a large value and the rate of change of the rough road continuation rate $R_{bc}$ obtained by dividing the accumulated rough road travel distance $D_{ba}$ by the road surface determination accumulated travel distance D becomes small. As a result, the accuracy of erroneous determination based on the rough road continuation rate $R_{bc}$ can be further improved.

Next, the deactivation flag clear determination shown in FIG. 6B will be described.

First, in Step S380, the sound vibration start determining unit 26 determines whether or not the deactivation flag $f_{no}$ is set to "1". Then, when the sound vibration start determining unit 26 determines that the deactivation flag $f_{no}$ is not "1" (determines that it is "0"), the sound vibration start determining unit 26 terminates this routine. On the other hand, when the sound vibration start determining unit 26 determines that the deactivation flag $f_{no}$ is "1", the processes from Step S381 are executed.

In Step S381, the sound vibration start determining unit 26 determines whether or not a smooth road continuation rate $R_{gc}$ is equal to or greater than a predetermined smooth road continuation rate threshold value $R_{gc\_th}$ in a state of having traveled over the predetermined travel distance $D_{\_th}$. Specifically, the sound vibration start determining unit 26 calculates the predetermined travel distance $D_{\_th}$ by the same method as the process in Step S350 described above. Then, the sound vibration start determining unit 26 determines whether or not the smooth road continuation rate $R_{gc}$ is equal to or greater than the smooth road continuation rate threshold value $R_{gc\_th}$ in the control period during the traveling over the predetermined travel distance $D_{\_th}$.

Here, the smooth road continuation rate $R_{gc}$ is a value obtained by dividing the accumulated smooth road travel distance $D_{gc}$ by the aforementioned road surface determination accumulated travel distance D. Further, the accumulated smooth road travel distance $D_{gc}$ can be calculated by multiplying the number of controls in which the road surface level Le is set to any of "0"-"2" by the above control unit distance $d_u$. Further, the smooth road continuation rate $R_{gc}$ may be obtained by subtracting the rough road continuation rate $R_{bc}$ obtained in Step S340 from 1 (corresponding to the total road surface determination accumulated travel distance D). Further, the smooth road continuation rate threshold value $R_{g\_th}$ is set to a suitable value from the viewpoint of determining that the smooth road determination based on the road surface level Le continues to the extent that the deactivation flag $f_{no}$ can be cleared (that is, determining that a rough road traveling determination based on an erroneous determination has not occurred).

Particularly, the smooth road continuation rate threshold value $R_{g\_th}$ is set to a suitable value from the viewpoint of suppressing the situation where the engine 1 does not operate even in a required scene due to the fact that the deactivation flag $f_{no}$, which is set from the viewpoint of suppressing the execution of the sound vibration start control on the basis of the rough road determination based on the above-mentioned erroneous determination, is always set to "1".

Then, when the sound vibration start determining unit 26 determines that the smooth road continuation rate $R_{gc}$ is equal to or greater than the smooth road continuation rate threshold value $R_{g\_th}$ over the predetermined travel distance $D_{\_th}$, the sound vibration start determining unit 26 proceeds to Step S382, sets the deactivation flag $f_{no}$ to "0", and terminates this routine. That is, in this case, the sound vibration start control switches from the invalid state to the valid state. On the other hand, when the above determination result is negative, the sound vibration start determining unit 26 proceeds to Step S383 and terminates this routine while maintaining the deactivation flag $f_{no}$.

Returning to FIG. 2, the sound vibration start determining unit 26 outputs the set deactivation flag $f_{no}$ to the start/stop flag setting unit 27.

The start/stop flag setting unit 27 executes the start/stop flag setting processes (start flag setting process and stop flag setting process) which set the start flags $f_{st}$ (normal start flag $f_{ust}$ and rough road start flag $f_{bst}$) for starting the engine 1 and the stop flags $f_{en}$ (normal stop flag $f_{uen}$ and rough road stop flag $f_{ben}$) for stopping the engine 1 using inputs of the battery SOC, deactivation flag $f_{no}$, and target motor torque $T_m$.

Figure 7:
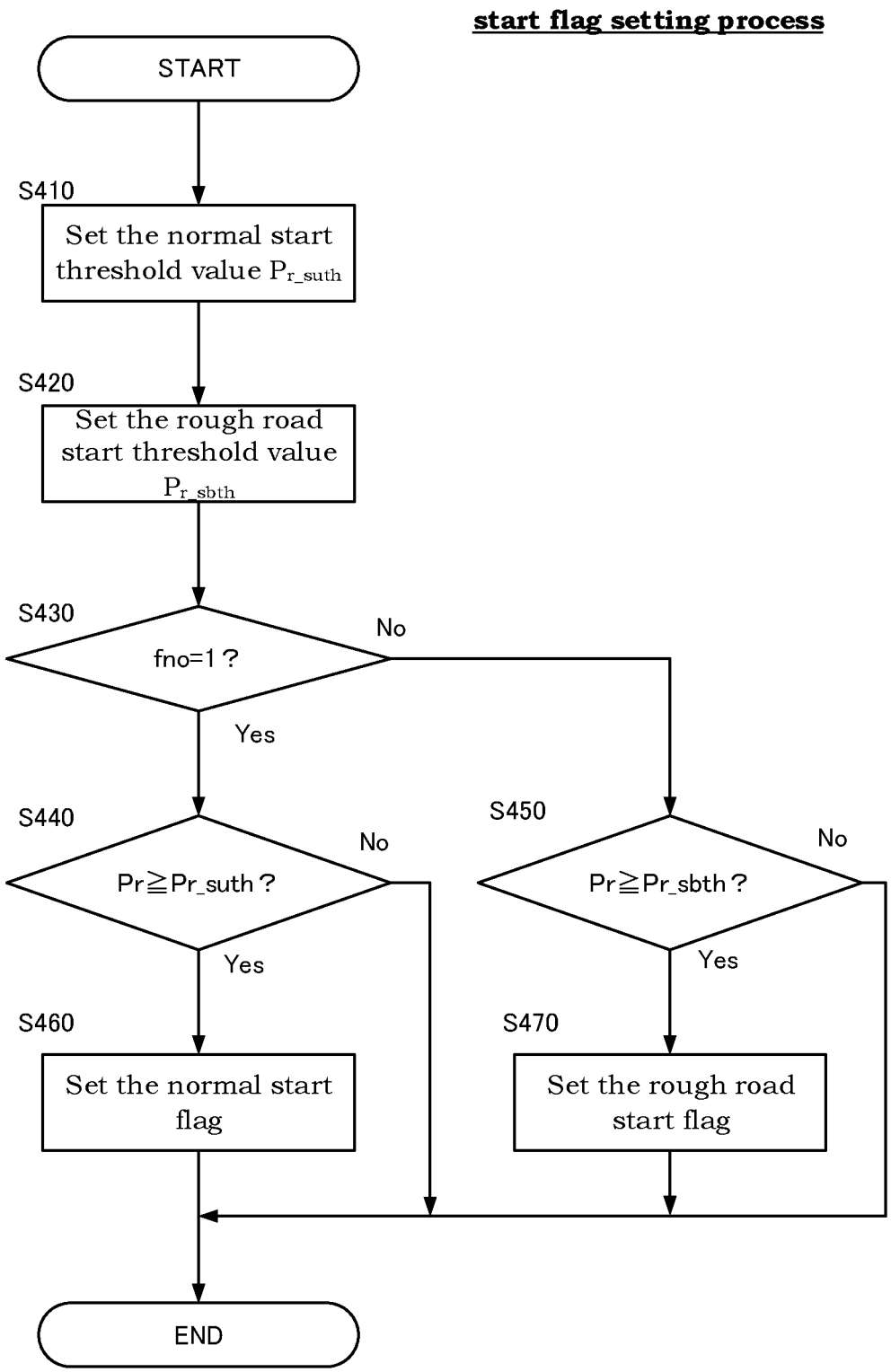
FIG. 7 is a flowchart explaining a start flag setting process.

FIG. 7 is a flowchart explaining the start flag setting process.

First, in Step S410 and Step S420, the start/stop flag setting unit 27 sets the normal start threshold value $P_{r\_suth}$ and the rough road start threshold value $P_{r\_sbth}$.

Here, the normal start threshold value $P_{r\_suth}$ is set as the value of the required output $P_r$ that defines the start timing, which is defined from the viewpoint of operating the engine 1 at the operating point with as good driving efficiency as possible (the operating point close to the optimum fuel consumption point) while keeping the battery SOC in an appropriate range. Therefore, the normal start threshold value $P_{r\_suth}$ of this embodiment is prepared in advance in the form of a map using variables of the required output $P_r$, vehicle speed v, and battery SOC.

On the other hand, the rough road start threshold value $P_{r\_sbth}$ is set as the value of the required output $P_r$ that defines the start timing, which is defined from the viewpoint of making the engine 1 easier to start than when the normal start threshold value $P_{r\_suth}$ is set, as long as the battery SOC does not exceed an appropriate range. That is, the rough road start threshold value $P_{r\_sbth}$ is set to a value equal to or less than the normal start threshold value $P_{r\_suth}$, and is prepared in advance in the form of a map using variables of the required output $P_r$, vehicle speed v, and battery SOC.

Next, in Step S430, the start/stop flag setting unit 27 determines whether or not the deactivation flag $f_{no}$ is "1". Then, when the start/stop flag setting unit 27 determines that the deactivation flag $f_{no}$ is "1" (when the sound vibration start control is invalid), the start/stop flag setting unit 27 shifts to the process of Step S440.

In Step S440, the start/stop flag setting unit 27 determines whether or not the required output $P_r$ is equal to or greater than the normal start threshold value $P_{r\_suth}$. Then, when the start/stop flag setting unit 27 determines that the required output $P_r$ is equal to or greater than the normal start threshold value $P_{r\_suth}$, the start/stop flag setting unit 27 sets the normal start flag $f_{ust}$ as the start flag $f_{st}$ in Step S460 and terminates this process.

On the other hand, when the start/stop flag setting unit 27 determines that the deactivation flag $f_{no}$ is "0" in Step S430 (when the sound vibration start control is valid), the start/stop flag setting unit 27 shifts to the process of Step S450.

In Step S450, the start/stop flag setting unit 27 determines whether or not the required output $P_r$ is equal to or greater than the rough road start threshold value $P_{r\_sbth}$. Then, when the start/stop flag setting unit 27 determines that the required output $P_r$ is equal to or greater than the rough road start threshold value $P_{r\_sbth}$, it sets the rough road start flag $f_{bst}$ as the start flag $f_{st}$ in Step S470 and terminates this process.

According to the start flag setting process described above, when the sound vibration start control is valid, a start flag $f_{st}$ (rough road start flag $f_{bst}$) will be set when the required output $P_r$ is equal to or greater than the rough road start threshold value $P_{r\_sbth}$ which is less than the normal start threshold value $P_{r\_suth}$.

Figure 8:
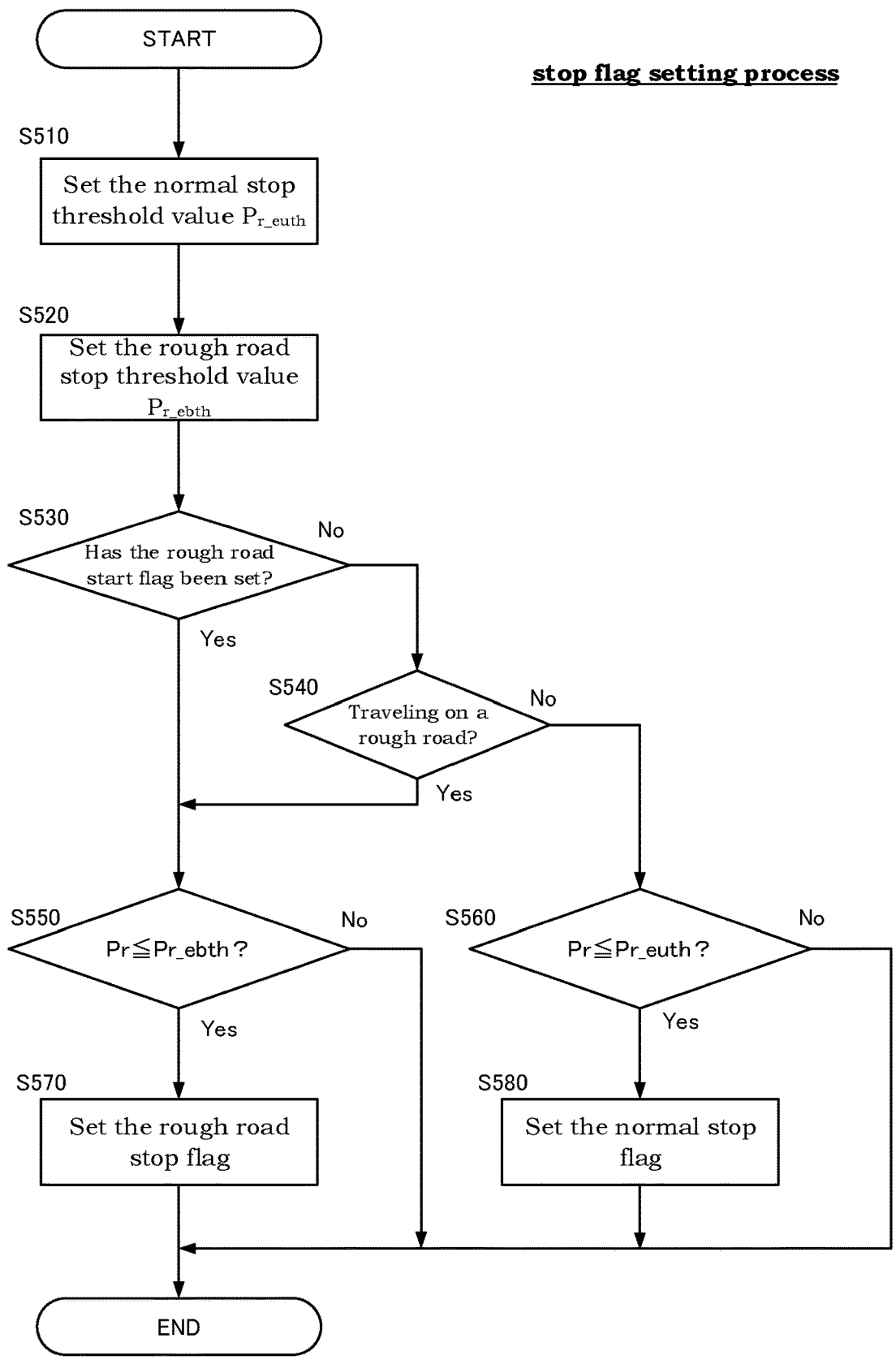
FIG. 8 is a flowchart explaining a stop flag setting process.

FIG. 8 is a flowchart explaining the stop flag setting process.

First, in Step S510 and Step S520, the start/stop flag setting unit 27 sets the normal stop threshold value $P_{r\_euth}$ and the rough road stop threshold value $P_{r\_ebth}$.

Here, the normal stop threshold value $P_{r\_euth}$ is set as the value of the required output $P_r$ that defines the stop timing which can sufficiently ensure the battery SOC even if the engine 1 is stopped (power generation is stopped). The normal stop threshold value $P_{r\_euth}$ is prepared in advance in the form of a map using variables of the required output $P_r$, vehicle speed v, and battery SOC.

On the other hand, the rough road stop threshold value $P_{r\_ebth}$ is set as the value of the required output $P_r$ that defines the stop timing which makes it more difficult to stop the engine 1 as long as the battery SOC can be kept within an appropriate range. That is, the rough road stop threshold value $P_{r\_ebth}$ is set to a value equal to or less than the normal stop threshold value $P_{r\_euth}$, and is prepared in advance in the form of a map using variables of the required output $P_r$, vehicle speed v, and battery SOC.

In Step S530, the start/stop flag setting unit 27 determines whether or not the rough road start flag $f_{bst}$ is set as the start flag $f_{st}$. Then, when the start/stop flag setting unit 27 determines that the rough road start flag $f_{bst}$ is set, the start/stop flag setting unit 27 shifts to the process of Step S550, and when the start/stop flag setting unit 27 determines that the rough road start flag $f_{bst}$ is not set, the start/stop flag setting unit 27 shifts to the process of Step S540.

In Step S540, the start/stop flag setting unit 27 determines whether or not the vehicle 100 is currently traveling on a rough road. Specifically, the start/stop flag setting unit 27 determines that the vehicle 100 is traveling on a rough road if the road surface level Le set at the current control timing is "3" or higher, and otherwise determines that the vehicle 100 is traveling on a smooth road.

Then, the start/stop flag setting unit 27 shifts to the process of Step S550 when the start/stop flag setting unit 27 determines that the vehicle 100 is currently traveling on a rough road, and shifts to the process of Step S560 when the start/stop flag setting unit 27 determines that the vehicle 100 is traveling on a smooth road.

In Step S550, the start/stop flag setting unit 27 determines whether or not the required output $P_r$ is equal to or less than the rough road stop threshold value $P_{r\_ebth}$. Then, when the start/stop flag setting unit 27 determines that the required output $P_r$ is equal to or less than the rough road stop threshold value $P_{r\_ebth}$, the start/stop flag setting unit 27 sets the rough road stop flag $f_{ben}$ as the stop flag $f_{en}$ (Step S570) and terminates this process. On the other hand, when the start/stop flag setting unit 27 determines that the required output $P_r$ is not equal to or less than the rough road stop threshold value $P_{r\_ebth}$, it terminates this process without setting a stop flag $f_{en}$.

In Step S560, the start/stop flag setting unit 27 determines whether or not the required output $P_r$ is equal to or less than the normal stop threshold value $P_{r\_euth}$. Then, when the start/stop flag setting unit 27 determines that the required output $P_r$ is equal to or less than the normal stop threshold value $P_{r\_euth}$, it sets the normal stop flag $f_{uen}$ as the stop flag $f_{en}$ (Step S580) and terminates this process. On the other hand, when the start/stop flag setting unit 27 determines that the required output $P_r$ is not equal to or less than the normal stop threshold value $P_{r\_euth}$, it terminates this process without setting a stop flag $f_{en}$.

According to the stop flag setting process described above, when the rough road start flag $f_{bst}$ is set as the start flag $f_{st}$ (when the engine 1 starts at the rough road start threshold value $P_{r\_sbth}$), the rough road stop flag $f_{ben}$ is set as the stop flag $f_{en}$ (the engine 1 will stop at the rough road stop threshold value $P_{r\_ebth}$). On the other hand, when the normal start flag $f_{ust}$ is set as the start flag $f_{st}$ (when the engine 1 starts at the normal start threshold value $P_{r\_suth}$), the rough road stop flag $f_{ben}$ or normal stop flag $f_{uen}$ is set depending on whether the traveling road surface at the time of stop is "rough road" or "smooth road".

Figure 9:
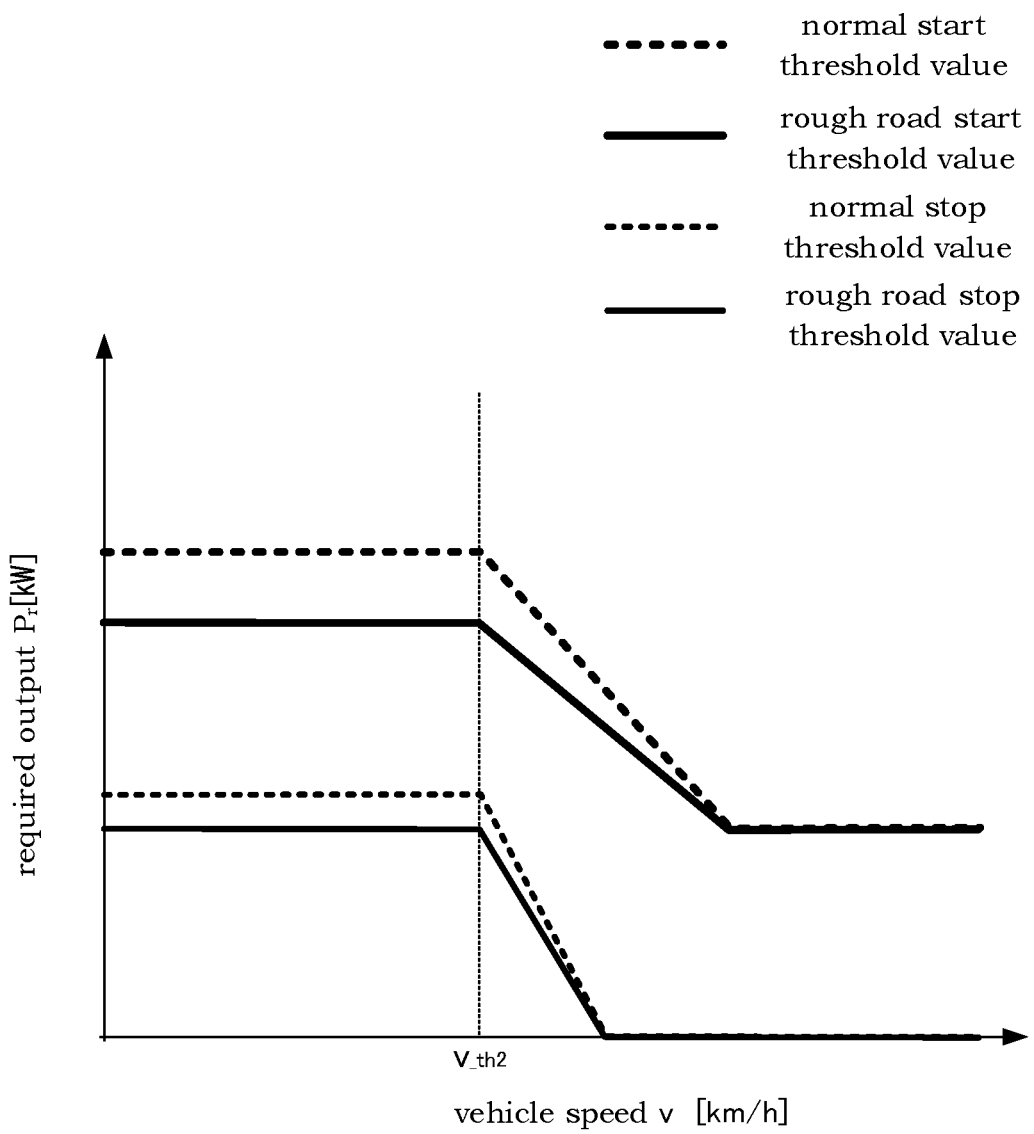
FIG. 9 is a diagram illustrating an example of a map that defines a start threshold value and a stop threshold value.

FIG. 9 shows an example of a map that defines the normal start threshold value $P_{r\_suth}$, rough road start threshold value $P_{r\_sbth}$, normal stop threshold value $P_{r\_euth}$, and rough road stop threshold value $P_{r\_ebth}$. According to the map shown in FIG. 9, regarding the rough road start threshold value $P_{r\_sbth}$, the rough road start threshold value $P_{r\_sbth}$ and rough road stop threshold value $P_{r\_ebth}$ are set to values lower than the normal start threshold value $P_{r\_suth}$ and normal stop threshold value $P_{r\_euth}$ in the low/medium vehicle speed region (the region where the vehicle speed v is equal to or less than the second vehicle speed threshold value $v_{\_th2}$). Particularly, the rough road start threshold value $P_{r\_sbth}$ and rough road stop threshold value $P_{r\_ebth}$ are set to values lower than the normal start threshold value $P_{r\_suth}$ and normal stop threshold value $P_{r\_euth}$ only in the SOC intermediate region where it is easy to tolerate changes in the battery SOC (the region where the battery SOC is difficult to deviate from the appropriate range even if the battery SOC changes), and in other SOC regions, it is preferable to set the rough road start threshold value $P_{r\_sbth}$ (rough road stop threshold value $P_{r\_ebth}$) and normal start threshold value $P_{r\_suth}$ (normal stop threshold value $P_{r\_euth}$) to substantially the same value. Thereby, it is possible to suppress overcharge or overdischarge of the battery 3 due to the execution of the sound vibration start control, or frequent start and stop of the engine 1 due to the battery SOC moving in and out of the appropriate range.

Further, the rough road start threshold value $P_{r\_sbth}$ and the normal start threshold value $P_{r\_suth}$ are set so that they become smaller values as the battery SOC becomes lower. Further, the rough road stop threshold value $P_{r\_ebth}$ and the normal stop threshold value $P_{r\_euth}$ are set so that they become larger values as the battery SOC becomes larger.

Returning to FIG. 2, the start/stop flag setting unit 27 outputs the set start flag $f_{st}$ and stop flag $f_{en}$ to the target power generation operating point setting unit 28.

The target power generation operating point setting unit 28 sets the operating point of the engine 1 using inputs of the start flag $f_{st}$ and stop flag $f_{en}$. Specifically, the target power generation operating point setting unit 28 sets the target rotation speed $N_e$ and target torque $T_e$ of the engine 1 in a manner that the fuel economy can be improved as much as possible within the range where the battery SOC can be maintained in the appropriate range (close to the optimum fuel economy point) according to the start timing and stop timing of the engine 1 defined by the start flag $f_{st}$ and stop flag $f_{en}$. Then, the target power generation operating point setting unit 28 outputs the set target rotation speed $N_e$ and target torque $T_e$ of the engine 1 to the power generator 2 (particularly, the unillustrated inverter of the power generator 2) and the engine 1 (particularly, the unillustrated engine controller), respectively.

FIG. 10 is a diagram illustrating a control result in which the control method according to this embodiment is applied to a specific traveling scene of the vehicle 100. FIG. 10(*a*) shows the section where the sound vibration start control is enabled. Further, FIG. 10(*b*) shows the change over time in the battery SOC. Further, FIG. 10(*c*) shows the change over time in the required output $P_r$, start threshold value $P_{r\_sth}$, and stop threshold value $P_{r\_eth}$. Particularly, the rough road start threshold value $P_{r\_sbth}$ and normal start threshold value $P_{r\_suth}$ are indicated by bold solid lines and bold dashed lines, respectively, and the rough road stop threshold value $P_{r\_ebth}$ and normal stop threshold value $P_{r\_euth}$ are indicated by thin solid lines and thin dashed lines, respectively.

As illustrated, the sound vibration start control is enabled by continuing the state of traveling on a "smooth road" until time t1 (Yes in Step S381 and Step S382 of FIG. 6B). Then, at time t1, the vehicle 100 starts traveling on a "rough road" and the sound vibration start control is started.

Then, at time t2, when the required output $P_r$ becomes equal to or greater than the rough road start threshold value $P_{r\_sbth}$, the rough road start flag $f_{bst}$ is set and the engine 1 starts (Yes in Step S450, and Step S470). Along with this, power generation is started and the battery SOC starts to increase.

Next, at time t3, the rough road continuation rate $R_{bc}$ exceeds the rough road continuation rate threshold value $R_{bc\_th}$, and the sound vibration start control becomes invalid (Yes in Step S350 and Step S360 in FIG. 6A). Then, the required output $P_r$ becomes equal to or less than the rough road stop threshold value $P_{r\_ebth}$ during the travel on a rough road, the rough road stop flag $f_{ben}$ is set, and the engine 1 stops (Yes in Step S540, Yes in Step S550, and Step S570). Along with this, power generation stops and the battery SOC starts to decrease.

According to the control method of this embodiment described above, there is realized a control, which makes it easier to start the engine 1 but makes it harder to stop the engine 1 than when the background noise of the vehicle 100 is in the low background noise state (when the road surface level Le is "0"-"2") if the background noise of the vehicle 100 is in the high background noise state (when the road surface level Le is "3" or "4"). Therefore, when the vehicle 100 is traveling, the generated power amount required according to the required output $P_r$ and the battery SOC can be satisfied while reducing the discomfort given to the occupant by the noise of the engine 1.

MODIFICATION

Next, modifications to the control method described in the above embodiment will be described.

Modification 1

A configuration, in which the execution and non-execution of the slip determining process, the estimation state determining process, or the sound vibration start determining process are switched by a predetermined switch (ignition switch, etc.) operated by the occupant, etc. of the vehicle 100, may be adopted. For example, a configuration in which the proper estimation flag $f_{op}$ is set to "0" in preference to the estimation state determining process, or a configuration in which the deactivation flag $f_{no}$ is set to "1" in preference to the sound vibration start determining process, may be adopted. Thereby, it is possible to select a mode in which the occupant, etc. of the vehicle 100 start the engine 1 if desired or a mode in which the engine 1 is not started.

Modification 2

The in-vehicle actuator to which the control method of this embodiment is applied is not limited to the engine 1. That is, if a device emits a certain operating sound (noise) to the extent that the occupant of the vehicle 100 may feel uncomfortable when the road noise value is small, the control described in the above embodiment can be applied with several modifications. Examples of such an in-vehicle actuator include air conditioner, fan, navigation system, and audio. Further, as another in-vehicle actuator, for a traveling sound generator that generates a sound that imitates the driving sound of the engine 1 in order to make people around the traveling vehicle 100 recognize the existence of the vehicle 100, the control method of this embodiment may be applied.

Modification 3

In this embodiment, the road surface level Le, which is an index of the magnitude of the background noise of the vehicle 100, is not limited to the 5 stages of "0"-"4". That is, the road surface level Le is an index of the magnitude of background noise of the vehicle 100 based on the road noise value itself and the estimation state for the road noise value, and if it is possible to separate the high background noise state from the low background noise state, it is possible to set the index to any number of stages. Further, the index of the magnitude of background noise of the vehicle 100 may be expressed by a parameter of continuous quantity.

Modification 4

Instead of or together with the angular acceleration A of the wheels 7 as the detection parameter for calculating the road noise value, any other detection parameters that correlate to the magnitude of road noise may be adopted. Such detection parameters include, for example, an angular acceleration of tire, a traveling sound directly detected using a microphone, etc., a G sensor detected value (correlated to changes in acceleration due to road surface conditions), and a suspension change amount (a change due to road surface conditions), etc.

Modification 5

A configuration, in which the execution and non-execution of the slip determining process, the estimation state determining process, the sound vibration start determining process, or the engine start itself are switched according to a predetermined operation mode set in the vehicle 100, may be adopted. For example, when the operation of the engine 1 is limited by the operation on a predetermined switch (when a manner mode is set), or in the state before the first start of the engine 1 when the vehicle 100 is started (when the power is turned on), the deactivation flag $f_{no}$ may be set to "1" in preference to the sound vibration start determining process, or the operation of the engine 1 itself may be prohibited.

The Configuration of this Embodiment and the Actions and Effects Thereof 1

According to this embodiment, an in-vehicle actuator control method for controlling the operation of an in-vehicle actuator which is a noise source is provided. This in-vehicle actuator control method includes: a road noise value estimating step that estimates a road noise value which quantifies a magnitude of a road noise from the angular acceleration A of the wheels 7 of the vehicle 100 (angular acceleration variance value calculating unit 241, variance value correcting unit 244); an estimation state determining step that determines whether or not the estimation state of the road noise value is the proper estimation state (FIG. 5); a background noise state determining step that determines whether the background noise of the vehicle 100 is in the high background noise state (road surface level Le="3"-"4") in which the background noise of the vehicle 100 is relatively large or the low background noise state (road surface level Le="0"-"2") in which the background noise of the vehicle 100 is relatively small based on the road noise value and the estimation state (road surface level setting unit 245); and an output adjusting step that adjusts the output of the in-vehicle actuator (engine 1) according to the determined background noise state of the vehicle 100 (FIG. 7 and FIG. 8).

Then, in the background noise state determining step (sound vibration start determining process), when it is determined that the estimation state is the proper estimation state (when all the determination results of Step S200 to Step S240 in FIG. 5 are positive), it is determined whether the background noise of the vehicle 100 is in the high background noise state or the low background noise state according to magnitudes of the road noise value and a predetermined threshold value (road surface level Le="2" and "3") (Step S300 is Yes, and Step S310 to Step S350). Further, in the background noise state determining step, when it is determined that the estimation state is not the proper estimation state (Step S300 is No), it is determined that the background noise of the vehicle 100 is in the low background noise state regardless of the road noise value (Step S360).

Further, in the output adjusting step, when it is determined that the background noise of the vehicle 100 is in the high background noise state, the output of the in-vehicle actuator is set so that the noise accompanying the operation of the in-vehicle actuator (the noise accompanying the operation of the engine 1) becomes relatively large. On the other hand, when it is determined that the background noise of the vehicle 100 is in the low background noise state, the output of the in-vehicle actuator is set so that the noise accompanying the operation of the in-vehicle actuator becomes relatively small.

This increases the output of the in-vehicle actuator in the high background noise state where it is difficult for the occupant of the vehicle 100 to recognize the noise accompanying the operation of the in-vehicle actuator, while the control of decreasing the output of the in-vehicle actuator is realized in the low background noise state where it is easily to recognize the noise. Particularly, when the estimation accuracy of the road noise value (detection accuracy of the angular acceleration A) is low, by determining that the background noise of the vehicle 100 is in the low background noise state regardless of the road noise value, it is possible to prevent the situation where the output of the in-vehicle actuator is set high in the low background noise state based on an erroneous determination. As a result, it is possible to more reliably prevent giving an uncomfortable feeling to the occupant due to a noise accompanying an operation of an in-vehicle actuator.

Further, in this embodiment, an in-vehicle actuator control apparatus (controller 50) that executes the above-mentioned in-vehicle actuator control method is provided. Particularly, the controller 50 functions as the road noise value estimating units (the angular acceleration variance value calculating unit, and the variance value correcting unit 244, and the road surface level setting unit 245) that execute the road noise value estimating step, the estimation state determining unit 243 that executes the aforementioned estimation state determining step, the background noise state determining unit (the road surface level setting unit 245) that executes the background noise state determining step, and the output adjusting unit (the start/stop flag setting unit 27 or the target power generation operating point setting unit 28) that executes the output adjusting step.

Further, in the estimation state determining step of this embodiment, when the mechanical brake of the vehicle 100 is operating, it is determined that the estimation state of the road noise value is not the proper estimation state (No in Step S200, and Step S270).

That is, it is possible to set the mechanical brake operation time when the friction force acting on the wheels 7 is a disturbance element against the angular acceleration A for estimating the road noise value as a specific scene for determining that the estimation state of the road noise value is not the proper estimation state. Further, in the vehicle 100 of this embodiment, a regenerative brake, which adjusts the regenerative force of the drive motor 4 according to the decrease amount in the accelerator opening APO to perform braking, is mounted as a braking function in addition to the mechanical brake. Therefore, depending on the braking scene, it is assumed that regenerative braking is executed more frequently than mechanical braking. Thus, even if a control logic, which determines that the vehicle is not in the proper estimation state when the mechanical brake operates, is adopted, the situation where it is always determined that the vehicle is not in the proper estimation state in the braking scene of the vehicle 100 (the situation where the output of the in-vehicle actuator is always set low during braking) is suppressed.

Further, in the estimation state determining step of this embodiment, when the wheels 7 slip, it is determined that the estimation state of the road noise value is not the proper estimation state (the slip determining process in FIG. 4A and FIG. 4B). That is, it is possible to set the slip time when the vibration of the angular acceleration A due to the idling of the wheels 7 becomes a disturbance element as a specific scene for determining that the estimation state is not the proper estimation state.

Further, in the estimation state determining step of this embodiment, when the acceleration (estimated value of forward/backward G) of the vehicle 100 is greater than a predetermined acceleration (detected value of forward/backward G) defined from the viewpoint of determining a rapid deceleration or rapid acceleration of the vehicle 100, it is determined that the wheels 7 are slipping (Yes in Step S150). That is, there is realized a logic that the scene of rapid deceleration or rapid acceleration, in which a stronger braking force or driving force is a disturbance element as compared with the scene of normal deceleration or acceleration, is determined as a scene where there is a risk of slipping.

Further, there may adopt a configuration in which it is determined that the wheels 7 are slipping when the target motor torque $T_m$ of the drive motor 4, which is the travel drive source mounted on the vehicle 100 instead of or together with the acceleration of the vehicle 100, is larger than the predetermined driving force defined from the viewpoint of determining the rapid deceleration or rapid acceleration of the vehicle 100. Particularly, in a scene where the vehicle 100 starts or stops on a slope road, it is assumed that the deceleration or acceleration is relatively small even during a rapid deceleration or rapid acceleration. That is, depending on the traveling scene, it is assumed that the time of rapid deceleration or the time of rapid acceleration cannot be specified with high accuracy only in view of the deceleration or acceleration. On the other hand, since the target motor torque $T_m$ is set to include a slope of a traveling path, the increase or decrease due to rapid deceleration or rapid acceleration is preferably reflected even on a slope road. Therefore, it is possible to more suitably identify the case where the vehicle 100 is slipping in a specific traveling scene such as when traveling on a slope road.

Further, in this embodiment, the vehicle 100 is configured as a series hybrid vehicle in which the power generator 2 is driven to charge the battery 3 and the battery 3 supplies electric power to the drive motor 4 for traveling according to the required output $P_r$, and the in-vehicle actuator is configured as the engine 1 for driving the power generator 2.

Then, in the output adjusting step, the start threshold value $P_{r\_sth}$, which is the threshold value of the required output $P_r$ for permitting the start of the engine 1, is set according to the determined background noise state of the vehicle 100 (road surface level Le is any of "0" to "4") (FIG. 7, FIG. 9). Further, the stop threshold value $P_{r\_eth}$, which is the threshold value of the required output $P_r$ for permitting the stop of the engine 1, is set (FIG. 8, FIG. 9).

Particularly, when the required output $P_r$ is equal to or greater than the start threshold value $P_{r\_sth}$, the start of the engine 1 is determined, and when the required output $P_r$ is equal to or less than the stop threshold value $P_{r\_eth}$, the stop of the engine 1 is determined.

Then, if it is determined that the background noise of the vehicle 100 is in the high background noise state (road surface level Le="3" to "4"), the start threshold value $P_{r\_sth}$ is set to the relatively smaller first start threshold value (rough road start threshold value $P_{r\_sbth}$) (Yes in Step S430, and Step S440). Further, the stop threshold value $P_{r\_eth}$ is set to the relatively smaller first stop threshold value (rough road stop threshold value $P_{r\_ebth}$) (Yes in Step S540, and Step S550). On the other hand, if it is determined that the background noise of the vehicle 100 is in the low background noise state (road surface level Le="0" to "2"), the start threshold value $P_{r\_sth}$ is set to the relatively larger second start threshold value (normal start threshold value $P_{r\_suth}$) (No in Step S430, and Step S450). Further, the stop threshold value $P_{r\_eth}$ is set to the relatively larger second stop threshold value (normal stop threshold value $P_{r\_euth}$) (No in Step S540, and Step S560).

As described above, the engine 1 in the series hybrid type vehicle 100 is assumed as the in-vehicle actuator by the control method described in the above embodiment, and by changing the required output $P_r$ that starts or stops the engine 1 as the output adjustment thereof, the start timing and stop timing of the engine 1 can be adjusted so as not to cause noise-induced discomfort to the occupant when the vehicle 100 is traveling.

The Configuration of this Embodiment and the Actions and Effects Thereof 2

According to this embodiment, the engine control method and the engine control apparatus, which are one aspect of the above-mentioned in-vehicle actuator control method and in-vehicle actuator control apparatus, are provided.

In the engine control method of this embodiment, the start threshold value $P_{r\_sth}$, which is the threshold value of the required output $P_r$ for starting the engine 1, is set in the series hybrid type vehicle 100 in which the power generator 2 is driven by the engine 1 to charge the battery 3 and the battery 3 supplies electric power to the drive motor 4 for traveling according to the required output $P_r$. Thus, this engine control method includes: a background noise state determining step that determines whether the background noise of the vehicle 100 is in the high background noise state (road surface level Le="3"-"4") in which the background noise of the vehicle 100 is relatively large or the low background noise state (road surface level Le="0"-"2") in which the background noise of the vehicle 100 is relatively small (road surface level setting unit 245); and a start/stop threshold value setting step that sets the start threshold value $P_{r\_sth}$ according to the background noise state of the vehicle 100 (start flag setting process).

Then, in the start/stop threshold value setting step, if it is determined that the background noise of the vehicle 100 is in the high background noise state, the start threshold value $P_{r\_sth}$ is set to the relatively smaller first start threshold value (rough road start threshold value $P_{r\_sbth}$) (No in Step S430, and Step S450), and if it is determined that the background noise of the vehicle 100 is in the low background noise state, the start threshold value $P_{r\_sth}$ is set to the relatively larger second start threshold value (normal start threshold value $P_{r\_suth}$) (Yes in Step S430, and Step S460).

Further, in the engine control method of this embodiment, the stop threshold value $P_{r\_eth}$, which is the threshold value of the required output $P_r$ for stopping the engine 1, is set according to the background noise state of the vehicle 100 in the start/stop threshold value setting step (stop flag setting process). Then, if it is determined that the background noise of the vehicle 100 is in the high background noise state (road surface level Le="3" to "4"), the stop threshold value $P_{r\_eth}$ is set to the relatively smaller first stop threshold value (rough road stop threshold value $P_{r\_ebth}$) (Yes in Step S540, and Step S550). Further, if it is determined that the background noise of the vehicle 100 is in the low background noise state (road surface level Le="0" to "2"), the stop threshold value $P_{r\_eth}$ is set to the relatively larger second stop threshold value (normal stop threshold value $P_{r\_euth}$) (No in Step S540, and Step S560).

Thereby, it is possible to make it harder to stop the engine 1 in the high background noise state than in the low background noise state. As a result, since it is easy to start the engine 1 while difficult to stop the engine 1 in the high background noise state in the configuration as described above, the amount of power generation (the amount of charge to the battery 3) can be ensured more suitably by increasing the operation time of the engine 1 in the high background noise state where the occupant of the vehicle 100 is hard to recognize noise. Further, in a situation that the high background noise state continues for a certain period of time, frequent repetition of the start and stop of the engine 1 due to the rough road start threshold value $P_{r\_sbth}$ and the rough road stop threshold value $P_{r\_ebth}$ being values close to each other is also suppressed.

Further, in this embodiment, an engine control method (controller 50) that executes the above engine control method is provided. That is, the controller 50 functions as the background noise state determining unit (road surface level setting unit 245) that executes the background noise state determining step, and the start/stop threshold value setting unit (start/stop flag setting unit 27) that executes the start/stop threshold value setting step.

Particularly, in the estimation state determining step of this embodiment, the rough road start threshold value $P_{r\_sbth}$ and the normal start threshold value $P_{r\_suth}$ are set to smaller values as the state of charge (battery SOC) of the battery 3 is lower. Thereby, it is possible to start the engine 1 in a manner that the battery SOC does not fall below the appropriate range in both the high background noise state and the low background noise state.

In addition, the engine control method of this embodiment further includes a road noise value estimating step (the angular acceleration variance value calculating unit 241 and variance value correcting unit 244) for estimating a road noise value that quantifies the magnitude of road noise from the angular acceleration A of the wheels 7 of the vehicle 100 (road surface level Le in the range of "1" to "4"). Then, in the road surface level setting unit 245, when the road noise value is equal to or greater than a predetermined threshold value (road surface level Le="2" and "3"), it is determined that the background noise of the vehicle 100 is in the high background noise state (Step S300 is Yes). Then, when the determination of the high background noise state based on the road noise value continues (when the rough road continuation rate $R_{bc}$ is equal to or greater than the rough road continuation rate threshold value $R_{bc\_th}$ over the predetermined travel distance $D_{\_th}$), it is determined in a later control that the background noise state of the vehicle 100 is the low background noise state regardless of the magnitude relation between the road noise value and the aforementioned threshold value (Yes in Step S350, and Step S360).

Thereby, it is possible to determine whether the background noise state of the vehicle 100 is the high background noise state or the low background noise state according to the magnitude relation between the road noise value calculated from the angular acceleration A and the predetermined threshold value. That is, a specific control logic for determining the background noise state of the vehicle 100 is realized. Then, if the state in which the road noise value is determined to be equal to or greater than the threshold value continues, the background noise state of the vehicle 100 will be determined to be the low background noise state in the subsequent control. Thus, it is possible to more reliably prevent overcharge of the battery 3 or deterioration of fuel consumption due to the fact that engine 1 keeps being started based on the rough road start threshold value $P_{r\_sbth}$, which is a value lower than the normal start threshold value $P_{r\_suth}$.

Particularly, the determination of the continuation of the high background noise state based on the road noise value is made based on whether or not the ratio of the distance traveled by the vehicle 100 on a rough road (rough road continuation rate $R_{bc}$) is equal to or greater than a reference value (rough road continuation rate threshold value $R_{bc\_th}$) in a predetermined control period (predetermined travel distance $D_{\_th}$). Thereby, it is possible to define a suitable control period for determining the low background noise state regardless of the road noise value by assuming the actual traveling scene of the vehicle 100. In addition, there may be adopted a configuration in which the continuation of the state that the road noise value is determined to be equal to or greater than the above threshold value is determined based on whether or not the ratio of rough road traveling time in a predetermined control period, instead of the rough road continuation rate $R_{bc}$, is equal to or greater than a reference value.

In addition, the engine control method of this embodiment further includes an estimation state determining step (FIG. 5) for determining whether or not the estimation state of the road noise value is the proper estimation state. Then, in the background noise state determining step, the control timing when it is determined that the estimation state is not the proper estimation state is excluded from the above control period (No in Step S300).

Thereby, when the estimation accuracy of the road noise value is not properly maintained according to the traveling scene of the vehicle 100, etc., the situation where it is determined that the above-mentioned high background noise state does not continue based on an erroneous determination (the situation where the background noise state is determined to be the low background noise state as a result) is suppressed. Thereby, it is possible to more reliably prevent giving an uncomfortable feeling to the occupant of the vehicle 100 due to operating the engine 1 in the low background noise state.

Further, in the engine control method of this embodiment, basically, the start threshold value $P_{r\_sth}$ and the stop threshold value $P_{r\_eth}$ are set so that the amount of power generation that maintains the battery SOC within the appropriate range is realized. That is, since the required amount of power generation is determined with respect to the amount of energy consumed when the vehicle 100 travels a certain travel distance (integral value of the required output $P_r$), the operation time of the engine 1 needs to be ensured according to the amount of power generation. On the other hand, by configuring to make both the start threshold value $P_{r\_sth}$ and stop threshold value $P_{r\_eth}$ in the high background noise state to be smaller than those in the low background noise state as mentioned above, the operation time of the engine 1 for securing the required amount of power generation can be suitably maintained. In other words, the frequency of the state in which the vehicle 100 is traveling without operating the engine 1 (EV traveling) can be maintained.

Particularly, in this embodiment, the rough road stop threshold value $P_{r\_ebth}$ and the normal stop threshold value $P_{r\_euth}$ are set to larger values as the battery SOC is higher. Thereby, it is possible to stop the engine 1 so that the battery SOC does not exceed the appropriate range in both the high background noise state and the low background noise state.

Further, the engine control method of this embodiment includes: the engine start determining step (FIG. 7) that generates the start command (start flag $f_{st}$) of the engine 1 when the required output $P_r$ is equal to or greater than the start threshold value $P_{r\_sth}$, and the engine stop determining step (FIG. 8) that generates the stop command (stop flag $f_{en}$) of the engine 1 when the required output $P_r$ is equal to or less than the stop threshold value $P_{r\_eth}$.

In the engine start determining step, when the background noise of the vehicle 100 is in the high background noise state (No in Step S430), a rough road start flag $f_{bst}$ is generated once the required output $P_r$ becomes equal to or greater than the rough road start threshold value $P_{r\_sbth}$ (Yes in Step S450, and Step S470), and when the background noise of the vehicle 100 is in the low background noise state (Yes in Step S430), a normal start flag $f_{ust}$ is generated once the required output $P_r$ becomes equal to or greater than the normal start threshold value $P_{r\_suth}$ (Yes in Step S440, and Step S460).

On the other hand, in the engine stop determining step (start/stop flag setting unit 27), when the background noise of the vehicle 100 is in the high background noise state (Yes in Step S530), a rough road stop flag $f_{ben}$ is generated once the required output $P_r$ becomes equal to or less than the rough road stop threshold value $P_{r\_ebth}$ (Yes in Step S550, and Step S570), and when the background noise of the vehicle 100 is in the low background noise state (No in Step S530), a normal stop flag $f_{eun}$ is generated once the required output $P_r$ becomes equal to or less than the normal stop threshold value $P_{r\_euth}$ (Yes in Step S460, and Step S580).

Thus, there is realized a specific control logic for making it easier to start the engine 1 but more difficult to stop the engine 1 in the high background noise state than in the low background noise state.

Further, in the engine start command step, when the background noise of the vehicle 100 continues to be determined to be in the high background noise state (Yes in Step S350, and Step S360), a normal start flag $f_{ust}$ is generated once the required output $P_r$ becomes equal to or greater than the normal start threshold value $P_{r\_suth}$ regardless of the determination result of the background noise state of the vehicle 100 in a later control (Yes in Step S430, Yes in Step S440, and Step S460).

Thus, there is realized a control logic that even if the determination of being in the high background noise state continues for a certain period of time or longer, the engine 1 can be started based on the normal start threshold value $P_{r\_suth}$ without restraining the actual start of the engine 1 to the determination. Therefore, it is possible to avoid the above-mentioned overcharge of the battery 3 and deterioration of fuel efficiency.

Further, there may be adopted a configuration in the engine stop command step, wherein when the background noise of the vehicle 100 continues to be determined to be in the high background noise state, a normal stop flag $f_{uen}$ is generated once the required output $P_r$ becomes equal to or less than the normal stop threshold value $P_{r\_euth}$ regardless of the determination result of the background noise state of the vehicle 100 in a later control. With this configuration, it is possible to avoid the overcharge of the battery 3 and deterioration of fuel efficiency.

Further, in the engine stop command step in the engine control method of this embodiment, if the engine 1 is started when the required output $P_r$ becomes equal to or greater than the rough road start threshold value $P_{r\_sbth}$ (Yes in Step S530), a stop command (rough road stop flag $f_{ben}$) is generated once the required output $P_r$ becomes equal to or less than the rough road stop threshold value $P_{r\_ebth}$ regardless of the background noise state of the vehicle 100 (Yes in Step S550, and Step S570). On the other hand, if the engine 1 is started when the required output $P_r$ becomes equal to or greater than the normal start threshold value $P_{r\_suth}$ (No in Step S530), a stop flag $f_{en}$ is generated once the required output $P_r$ becomes equal to or less than the rough road stop threshold value $P_{r\_ebth}$ or equal to or less than the normal stop threshold value $P_{r\_euth}$ according to the background noise state of the vehicle 100 (Step S540 to Step S580).

Thus, if the engine 1 is started based on the rough road start threshold value $P_{r\_sbth}$ which is set in the high background noise state (especially when traveling on a rough road), the engine 1 will be stopped based on the rough road stop threshold value $P_{r\_euth}$ for the high background noise state regardless of the background noise state at the time of stop. Therefore, although the relatively small rough road start threshold value $P_{r\_sbth}$ (for rough roads) is applied when the engine 1 is started, by applying the relatively large normal stop threshold value $P_{r\_euth}$ (for smooth roads) when stopping the engine 1, the situation in which the engine 1 is frequently started and stopped due to the start threshold value $P_{r\_sth}$ and the stop threshold value $P_{r\_eth}$ being close to each other is suppressed.

On the other hand, if the engine 1 is started based on the normal start threshold value $P_{r\_suth}$ which is set in the low background noise state (especially when traveling on a smooth road), the start threshold value $P_{r\_sth}$ and stop threshold value $P_{r\_eth}$ are separated from each other to some extent even when the rough road start threshold value $P_{r\_sbth}$, which is smaller than the originally assumed normal stop threshold value $P_{r\_euth}$, is applied when stopping the engine 1. Thus, the engine 1 can be stopped by applying the normal stop threshold value $P_{r\_euth}$ or a value equal to or less than the rough road stop threshold value $P_{r\_ebth}$ according to the background noise state of the vehicle 100 at the time of stopping the engine 1.

While the embodiments of the present invention have been described above, the above-described embodiments only show part of application examples of the present invention and are not intended to limit the technical scope of the present invention to the specific configurations of the above-described embodiments.

The invention claimed is:

1. An in-vehicle actuator control method for controlling an operation of an in-vehicle actuator, which is a noise source, comprising:
   a road surface level setting step of detecting a wheel speed of a wheel of a vehicle, estimating an angular acceleration from the wheel speed, and setting a road surface level based on the angular acceleration, wherein the road surface level quantifies a degree of road surface roughness correlating with a magnitude of a road noise;
   a background noise state determining step of determining a background noise state of the vehicle based on the road surface level; and
   an output adjusting step of adjusting an output of the in-vehicle actuator according to the background noise state of the vehicle,
   wherein in the background noise state determining step,
   it is determined whether an estimation accuracy of the angular acceleration exceeds a standard or meets a condition;
   in response to determining that the estimation accuracy of the angular acceleration exceeds the standard or meets the condition, it is determined that the background noise state is in a high background noise state when the road surface level is equal to or more than a predetermined threshold value and is in a low background noise state when the road surface level is less than the predetermined threshold value; and
   in response to determining that the estimation accuracy of the angular acceleration does not exceed the standard or meet the condition, it is determined that the background noise state is in the low background noise state regardless of the road surface level; and
   wherein in the output adjusting step,
   an output of the in-vehicle actuator is set to be larger in response to determining that the background noise state is in the high background noise state than in response to determining that the background noise state is in the low background noise state.

2. The in-vehicle actuator control method according to claim 1, wherein in the background noise state determining step:
it is determined that the estimation accuracy of the angular acceleration does not exceed the standard or meet the condition in response to detecting that a mechanical brake of the vehicle is operating.

3. The in-vehicle actuator control method according to claim 1, wherein in the background noise state determining step:
it is determined that the estimation accuracy of the angular acceleration does not exceed the standard or meet the condition in response to detecting that the wheel is slipping.

4. The in-vehicle actuator control method according to claim 3, wherein in the background noise state determining step:
it is determined that the wheel is slipping in response to detecting that an acceleration of the vehicle is greater than a predetermined acceleration defined from a viewpoint of determining a rapid deceleration or rapid acceleration of the vehicle.

5. The in-vehicle actuator control method according to claim 3, wherein in the background noise state determining step:
it is determined that the wheel is slipping in response to detecting that a driving force of a travel drive source mounted on the vehicle is greater than a predetermined driving force defined from a viewpoint of determining a rapid deceleration or rapid acceleration of the vehicle.

6. The in-vehicle actuator control method according to claim 1, wherein:
the vehicle is configured as a series hybrid vehicle in which a power generator is driven to charge a battery and this battery supplies electric power to a drive motor for traveling according to a required output, and the in-vehicle actuator is configured as an engine for driving the power generator; and
in the output adjusting step, at least one of a start threshold value, which is a threshold value of the required output for starting the engine, or a stop threshold value, which is a threshold value of the required output for stopping the engine, is set according to the background noise state,
start of the engine is determined when the required output becomes equal to or greater than the start threshold value,
stop of the engine is determined when the required output becomes equal to or less than the stop threshold value,
at least one of the start threshold value is set to a first start threshold value or the stop threshold value is set to a first stop threshold value in response to determining that the background noise state is in the high background noise state, and
at least one of the start threshold value is set to a second start threshold value or the stop threshold value is set to a second stop threshold value in response to determining that the background noise state is in the low background noise state.

7. An in-vehicle actuator control apparatus for controlling an operation of an in-vehicle actuator, which is a noise source, comprising:
a road surface level setting unit for detecting a wheel speed of a wheel of a vehicle, estimating an angular acceleration from the wheel speed, and setting a road surface level based on the angular acceleration, wherein the road surface level quantifies a degree of road surface roughness correlating with a magnitude of a road noise;
a background noise state determining unit for determining a background noise state of the vehicle based on the road surface level; and
an output adjusting unit that adjusts an output of the in-vehicle actuator according to the background noise state of the vehicle, wherein:
wherein the background noise state determining unit,
determines whether an estimation accuracy of the angular acceleration exceeds a standard or meets a condition,
in response to determining that the estimation accuracy of the angular acceleration exceeds the standard or meets the condition, determines that the background noise state is in a high background noise state when the road surface level is equal to or more than a predetermined threshold value and is in a low background noise state when the road surface level is less than the predetermined threshold value, and
in response to determining that the estimation accuracy of the angular acceleration does not exceed the standard or meet the condition, determines that the background noise state is in the low background noise state regardless of the magnitude of the road surface level; and
wherein the output adjusting unit,
sets an output of the in-vehicle actuator to be larger in response to determining that the background noise state is in the high background noise state than in response to determining that the background noise state is in the low background noise state.

8. The in-vehicle actuator control method according to claim 1, wherein in the background noise state determining step:
it is determined that the estimation accuracy of the angular acceleration does not exceed the standard or meet the condition in response to detecting at least one of:
Vehicle Dynamics Control (VDC) is operating;
Traction Control System (TCS) is operating;
an accelerator opening is greater than a predetermined value;
Anti-lock Brake System (ABS) is operating;
a mechanical brake of the vehicle is operating;
a target torque of the in-vehicle actuator is out of a predetermined range;
a vehicle speed is out of a predetermined range;
the wheel is slipping;
Controller Area Network (CAN) communication is not valid; or
a number of samples of a variance for the angular acceleration is below a certain value.

* * * * *